US012615550B2

(12) United States Patent
Singh et al.

(10) Patent No.: US 12,615,550 B2
(45) Date of Patent: Apr. 28, 2026

(54) METHODS AND DEVICES FOR DETERMINATION OF AN UPDATE TIMESCALE FOR RADIO RESOURCE MANAGEMENT ALGORITHMS

(71) Applicant: Intel Corporation, Santa Clara, CA (US)

(72) Inventors: Vaibhav Singh, New Delhi (IN); Christian Maciocco, Portland, OR (US); Thijs Metsch, Bruehl (DE); Amar Srivastava, Kasavanahalli (IN)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 17/948,267

(22) Filed: Sep. 20, 2022

(65) Prior Publication Data

US 2024/0098575 A1      Mar. 21, 2024

(51) Int. Cl.
| | |
|---|---|
| *H04W 28/16* | (2009.01) |
| *H04W 16/22* | (2009.01) |
| *H04W 24/02* | (2009.01) |
| *H04W 48/16* | (2009.01) |
| *H04W 88/18* | (2009.01) |

(52) U.S. Cl.
CPC .......... *H04W 28/16* (2013.01); *H04W 16/22* (2013.01); *H04W 24/02* (2013.01); *H04W 48/16* (2013.01); *H04W 88/18* (2013.01)

(58) Field of Classification Search
CPC ..... H04W 28/16; H04W 16/22; H04W 24/02; H04W 48/16; H04W 88/18
See application file for complete search history.

(56) References Cited

U.S. PATENT DOCUMENTS

| | | | |
|---|---|---|---|
| 10,039,016 B1 * | 7/2018 | Larish ................... | H04W 24/02 |
| 2016/0165472 A1 * | 6/2016 | Gopalakrishnan .... | H04W 24/10 |
| | | | 455/67.11 |
| 2017/0063503 A1 * | 3/2017 | Liu ........................ | H04L 1/0003 |
| 2019/0313314 A1 * | 10/2019 | Yang ..................... | H04W 24/10 |
| 2021/0400765 A1 * | 12/2021 | Bedekar ............... | H04W 76/27 |
| 2023/0199565 A1 * | 6/2023 | Vannithamby ..... | H04B 17/3913 |
| 2023/0337043 A1 * | 10/2023 | Pateromichelakis ....... | |
| | | | H04W 28/0263 |

* cited by examiner

*Primary Examiner* — Dhaval V Patel
(74) *Attorney, Agent, or Firm* — Viering, Jentschura & Partner mbB

(57) ABSTRACT

A device may include a memory and a processor configured to obtain cell data representative of one or more attributes associated with a state of a cell of a mobile communication network, wherein radio resources of the cell are managed based on a radio resource management model, determine, for the radio resource management model, an update timescale based on the cell data, and communicate timescale information representative of the determined update timescale to the radio resource management model, wherein the timescale information is configured to cause the radio resource management model to update model parameters to manage the radio resources of the cell based on the determined update timescale.

25 Claims, 7 Drawing Sheets

| | 1201 | 1202 | 1203 |
|---|---|---|---|
| Class | Performance T= 1week. | Performance T=2 week |
| Cell 1 | 60% | 50% |
| Cell 2-10 | 75% | 95% |
| Cell 11 | 99% | 99% |

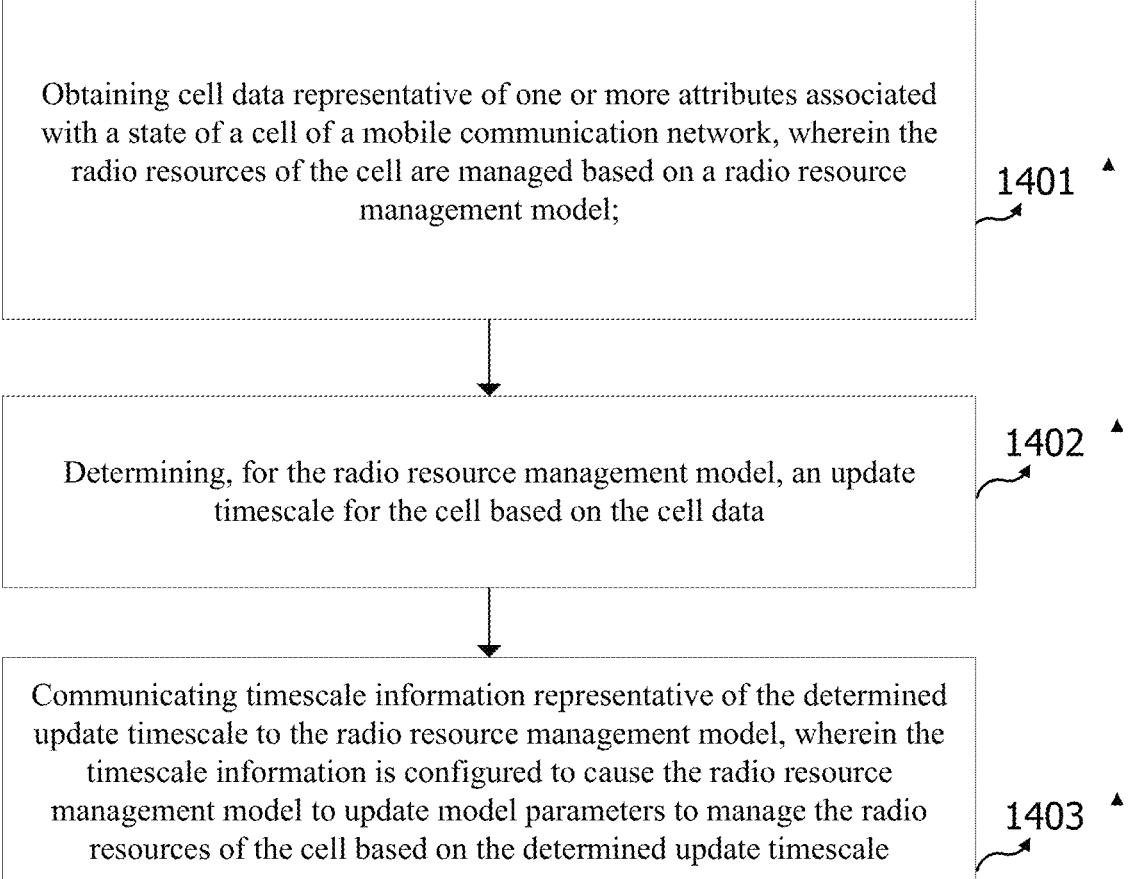

Obtaining cell data representative of one or more attributes associated with a state of a cell of a mobile communication network, wherein the radio resources of the cell are managed based on a radio resource management model;     1401

Determining, for the radio resource management model, an update timescale for the cell based on the cell data     1402

Communicating timescale information representative of the determined update timescale to the radio resource management model, wherein the timescale information is configured to cause the radio resource management model to update model parameters to manage the radio resources of the cell based on the determined update timescale     1403

FIG. 14

METHODS AND DEVICES FOR DETERMINATION OF AN UPDATE TIMESCALE FOR RADIO RESOURCE MANAGEMENT ALGORITHMS

TECHNICAL FIELD

This disclosure generally relates to methods and devices for the determination of an update timescale for radio resource management algorithms.

BACKGROUND

In mobile radio communication networks in accordance with many mobile radio communication technologies, such as Fourth Generation (LTE) and Fifth Generation (5G) New Radio (NR), there are various techniques that are applied to manage radio resources. Such techniques may include controlling parameters associated with scheduling transmission of radio communication signals, transmit power, allocation of mobile communication devices within radio resources, beamforming, data rates for communications, handover functions, modulation and coding schemes, etc.

Radio resource managing entities of a mobile communication network may manage radio resources within the mobile communication network using radio resource management models employing various algorithms, such as trained machine learning models, to obtain parameters associated with the management of the radio resources. Due to varying conditions within the mobile communication network, a radio resource management model may be updated from time to time in order to fit the radio resource management model to the conditions of the mobile communication network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 14 shows an example of a method.

DESCRIPTION

Figure 1:
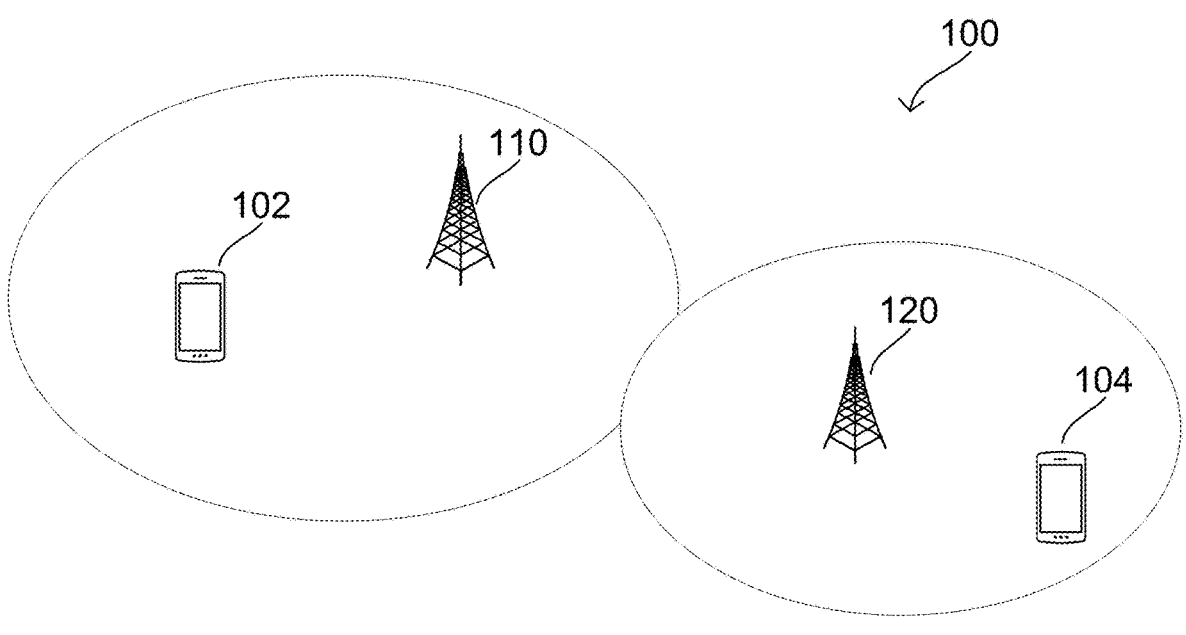
FIG. 1 shows exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UNITS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UNITS (3G)"), Wideband Code Division Multiple Access (Universal Mobile Telecommunications System) ("W-CDMA (UNITS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UNITS Terrestrial Radio Access ("UTRA"), Evolved UNITS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("WITS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

Figure 2:
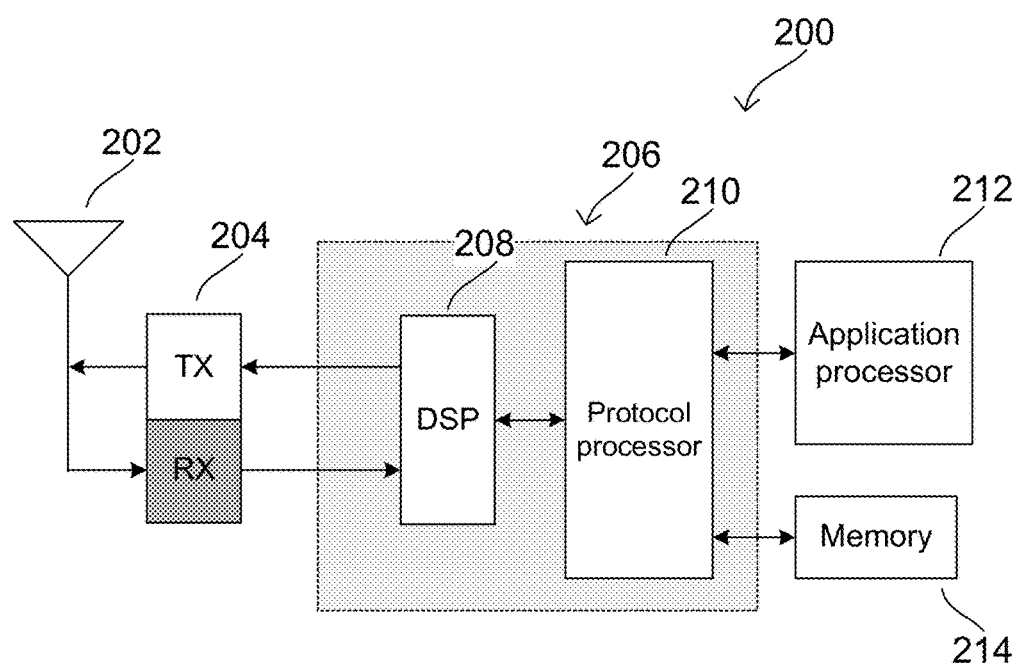
FIG. 2 shows an exemplary internal configuration of a communication device.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of a communication device according to various aspects provided in this disclosure. The communication device may include a terminal device 102, and it will be referred to as terminal device 102, but the communication device may also include various aspects of network access nodes 110, 120 as well. The terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

With exposure to terabytes (TBs) of data from the multiple cells, different AI/ML based Radio Resource Management (RRM) algorithms are designed to learn from the user patterns, network data traffic patterns, and/or mobility patterns to optimize radio access network (RAN) operation. For example, RRM models associated with load balancing, CQI (Channel Quality Indicator) period optimization, connectivity optimization, optimization of RAN resources like MIMO usage, sub-band (frequency) usage, energy saving, etc. can be further optimized to support the workloads after learning past behaviors supported by the RAN.

There are certain key common and possibly central AI/ML models that can serve with different RRM algorithms, for example, load prediction, spectral efficiency prediction, traffic prediction, etc., which may help optimize RAN resources to meet workload requirements. Such an AI/ML model may have complexity at various levels, for example, deep Neural Networks (NNs), transformers. AI/ML models may require updates once deployed on the field, causing high latency in the inference and requiring high platform compute, memory, and storage capabilities for training as well as inference.

Furthermore, terminal devices, such as UEs, may select different network slices of the mobile communication network using NSSAI, and each slice may have certain capabilities or may be optimized for particular workloads. Moreover, each network slice may employ different accelerators i.e. FPGAs, smart network interface controllers (NICs), and infrastructure processing units (IPUs) than other network slices based on preset requirements associated with the respective network slice. In accordance with various aspects provided herein, RRM models may consider slice capabilities and parameters associated with the capabilities of slices with the intention to provide the best service level agreements (SLAs). It may be desirable to improve the performance of an AI/ML model associated with RRM along with reduced compute and power consumption dynamically by selecting dynamically, based on the overall environment, the timescale at which the AI/ML models need to be updated.

Figure 3:
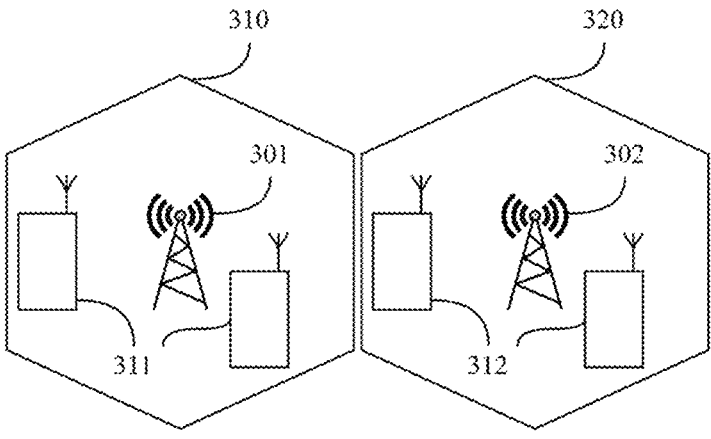
FIG. 3 shows an exemplary illustration of two cells of a mobile communication network.

FIG. 3 shows an exemplary illustration of two cells of a mobile communication network. Radio resource management models may provide their outputs on a cell-basis, a cell being a particular geographical region covered by a network access node. The size of a cell may depend on the mobile radio communication technology used by the network access node associated with the cell. For example, within the context of a wireless local area network (WLAN), a cell may have a radius of up to 100 meters, while within the context of cellular communication a cell may have a radius of up to 50 kilometers.

In this illustration, a first cell 310 is depicted as it includes a first network access node 301, such as a base station, and a second cell 320 is depicted as it includes a second network access node 302. The network access nodes 301, 302 may perform operations associated with the radio access network in order to provide radio coverage over the geographic areas that may be represented by the cells 310, 320 respectively. First group of terminal devices 311 within the first cell 301 may access the mobile communication network over the first network access node 301, and second group of terminal devices 312 within the second cell 302 may access the mobile communication network over the second network access node 302.

A network access node, such as a base station, may provide network access services to terminal devices within a cell. With the recent employment of distributed radio access networks, one or more remote radio units may be deployed for a cell to communicate with terminal devices within the cell using radio communication signals. Accordingly, in this illustration, the depicted network access nodes 301, 302 may include remote radio head units. Such remote radio units may be connected to further controller entities to communicate via wired (e.g. fronthaul) and/or wireless communications, and the controller entities (such as a controller unit, a central unit, a distributed unit) may manage radio resources associated with the one or more radio units within the cell.

In various examples, a separate entity within the mobile communication network may perform various functions to manage radio resources associated with the one or more radio units within the cell. A radio resource management model, such as a trained artificial intelligence machine learning (AI/ML) model that is trained and configured to output at least one parameter associated with managing radio resources of at least one cell of a mobile communication network, may be employed for the management of radio resources. The trained AI/ML may operate as a radio resource management model configured to provide an output that is used to manage radio resources within each cell. Based on the provided output, the respective network access mode associated with the respective cell may manage the radio resources (e.g. schedule radio transmissions, allocate resources, handover a terminal device to another network access node, etc.).

In accordance with various aspects provided herein, a network access node of a cell may implement the trained AI/ML model that is configured to output at least one parameter used to manage radio resources of the cell (i.e. radio resource management model). In accordance with various aspects provided herein, a further entity other than the network access node within the mobile communication network may implement the respective trained AI/ML model. For example, in a distributed RAN architecture (e.g. Open RAN), a central unit (O-CU (e.g. O-CU-Control Plane (CP))) may implement the trained AI/ML model. In various examples, a near real-time RAN intelligent controller (a near RT RIC) may implement the trained AI/ML model. In such a case, an xApp may include the trained AI/ML model. In a scenario, in which the further entity implements the trained AI/ML model, the respective further entity may communicate with the network access node or other further entities within the mobile communication network in order to receive data, based on which the respective further entity may obtain input data of the trained AI/ML model that provides the output based on the input data.

Conditions associated with mobile radio communication tend to change in time and space due to various reasons, such as weather conditions, the number of communication devices, radio signal interference, relative location of radio access nodes to terminal devices, terrain, etc. Furthermore, operator preferences may also affect such conditions, as, for example, communication conditions obtained based on an operator preference towards power conservation may not be the same for communication conditions obtained based on another operator preference towards data throughput.

An update of a trained AI/ML model may cause operational costs, for example in terms of bandwidth as the radio resource management model may need to exchange data with a training repository to receive training data to be used to train the AI/ML model, and/or in terms of computation costs and power consumption, as the entity implementing the AI/ML model may need to perform many inferences to train the AI/ML. Accordingly, while more frequent updates may increase the operational costs associated with the operation of the AI/ML model, less frequent updates may increase estimation and/or prediction errors due to disregarding the changed conditions of the cell. It may be desirable to implement a varying update timescale, based on which the AI/ML model is updated, according to the conditions of the cell.

In other words, each cell and the AI/ML model that is configured to provide output to manage radio resources of the cell may have a unique distribution shift based on the conditions of the cell and the respective AI/ML model associated with the cell. Determining what should be the right time for updating each AI/ML model of each cell of the mobile communication network may be desirable. If the update of an AI/ML is too often, excess overhead may be experienced in terms of computation, network, storage, on the other hand if the AI/ML is not updated for a long time the performance and reliability of the AI/ML model may decrease. Therefore, there is an innate tradeoff between performance and computation. Moreover, it may be desirable to consider the preferences of the mobile network operator with respect to the importance of performance vs. computation for the management of radio resources associated with the cell in order to determine the update time of the AI/ML model.

Updating the AI/ML model for RRM operation at a finer timescale update may result in data sampling overhead, re-training/inference computing overhead hence additional energy, and memory/storage overhead. It may be desirable to balance the overhead caused by updating the AI/ML model with the prediction performance while choosing an appropriate timescale for updating the AI/ML model. Moreover, as there may be no closed form expression to determine the performance of the AI/ML model as a function of model update timescale, the determination of the right update timescale manually may be challenging. Furthermore, it is to be noted that based on the dynamics of the cell conditions, the same AI/ML model used in different groups of cells may have different appropriate update timescales. For example, the cell in which the load distribution changes very dynamically, for example, every day, it may be desirable to update the trained AI/ML at a finer timescale, such as a timescale of a day or a few days, whereas, in a cell where load distribution is more static, (e.g., serving the edge of a city or more rural area) it may be desirable to update the trained AI/ML at a coarser timescale, such as a timescale of a few weeks.

In accordance with various aspects provided herein, conditions of a cell (e.g. the first cell 310 or the second cell 320) may include an attribute associated with a state of the respective cell that is related to radio communication, such as, user density (i.e. density/number of terminal devices) within the cell, cell load of the cell (e.g. a ratio based on number of used PRBs and number of available PRBs, or number terminal devices that are connected to the network access node), location of the cell, the topology associated with the location of the cell (i.e. the topology of the geographical area covered in the cell), mobility of terminal devices within the cell that are served by the respective network access node (e.g. UEs in RRC_Connected mode), computing resources used by the respective network access node, and/or used by a radio resource managing entity associated with the network access node (e.g. computing resources used by the AI/ML model), in order to manage radio resources of the cell, intra-cell cross-interference (i.e. cross-interference associated with radio communication between the group of terminal devices) within the cell and/or inter-cell cross-interference (i.e. cross interference associated with radio communication between cells (e.g. between the first cell 310 and the second cell 320)). In accordance with various aspects provided herein, a network access node (e.g. the first network access node 301 and/or the second network access node 302) or a further network entity connected to the network access node may obtain and/or determine various information that may represent the conditions of a respective cell.

For example, in a RAN environment, conditions of each cell of the first cell 301 and second cell 302, such as cell traffic volume, cell Physical Resource Block (PRB) usage, number of users (i.e. terminal devices), performance indicators, etc., may be dynamic with respect to time and space. For example, in a particular cell, the PRB usage load may vary with the time of the day and across multiple cells based on the geo-location. Moreover, the distribution of different cell conditions, for example, PRB usage, user density also may change with time. This degree of change of distribution varies from cell to cell as well as time, based on different characteristics of the cell, such as for example, cell topology, user density, average mobility, etc.

As the conditions associated with mobile radio communication tend to change in time and space, it may be desirable to update the trained AI/ML in order to take the changed conditions into account. One of the assumptions in inferencing using trained AI/ML models is that the training and test distribution are similar. Therefore, to maintain performance, it may be desirable to update the trained AI/ML models according to the cell conditions. An update may include a further training of the trained AI/ML model with new training data that are more similar to the conditions of the cell, or retraining the AI/ML model with training data that may be more similar to the conditions of the cell.

For this purpose, an entity within the mobile communication network may determine an update timescale for the trained AI/ML model that is used to manage radio resources of the cell. The update timescale may represent an instance of time to update the trained AI/ML model. In other words, the update timescale may represent an instance of time in which the trained AI/ML model is to be updated. The update timescale may represent a plurality of instances of time, or may represent an update period (e.g. the update is according to a period defined as the update timescale). The respective entity may determine the update timescale for a single trained AI/ML model used as a radio resource management model, or a combination of, or all trained AI/ML models used to manage radio resources of the respective cell.

In accordance with various aspects provided herein, the network access node may determine the update timescale for the trained AI/ML model based on cell conditions. The network access node may store cell data that is representative of conditions of the cell that are associated with the radio communication. The cell data may include information representative of at least one of, or any combination of, or all of, user density within the cell, cell load of the cell, location of the cell, the topology associated with the location of the cell, mobility of terminal devices within the cell that are served by the respective network access node, computing resources used by the respective network access node in order to manage radio resources of the cell, or available computing resources for each network slice (i.e. such as hardware capability (connected accelerators—FPGA, Smart NIC, IPU etc.) and software characteristics (reliability, availability, and serviceability (RAS) capability, automotive safety integrity level (ASIL) compatibility, software characteristics like deterministic vs non deterministic processing, etc.) of network slices, and number of terminal served by particular slice for particular workload), intra-cell cross-interference within the cell and/or inter-cell cross-interference.

The cell data may include one data item associated with each of the above-mentioned condition attributes at a particular instance of time (e.g. the latest sample), or a plurality of data items for a plurality of time instances for each attribute, each of the plurality of data items is associated with the respective attribute for an instance of time of the plurality of time instances in order to represent the history associated with the respective attribute for a particular period of time represented by the plurality of time instances. For example, the cell data may include a time-series data associated with at least some of the attributes. The cell data may include any data that may represent or indicate the conditions of the cell that are associated with the radio communication and the above-mentioned examples should not be considered limiting. In particular, the cell data may include a plurality of past data items for attributes, such as user density, cell load, mobility of terminal devices, used computing resources to manage radio resources, power consumption for transmitting and receiving radio communication signals by the network access node of the cell, etc.

In accordance with various aspects provided herein, a further entity other than the network access node within the mobile communication network may determine the update timescale for the respective trained AI/ML model, and in some examples, it may be the same entity that implements the trained AI/ML model. For example, in a distributed RAN architecture (e.g. Open RAN), a central unit (O-CU (e.g. O-CU-Control Plane (CP))) may implement the entity that determines the update timescale. In various examples, a near real-time RAN intelligent controller (a near RT RIC) may implement the trained AI/ML model. In such a case, an xApp may include the trained AI/ML model. The near RT RIC may also determine the update timescale for the trained AI/ML. In various examples, another entity within the mobile communication network may determine the update timescale for the trained AI/ML implemented by the near RT RIC. In such an example, the another entity may be a non-RT RIC. In such examples, the further entity that determines the update timescale may receive the cell data from the respective network access node associated with the cell, or from another entity (e.g. O-DU, O-CU) that is connected to the network access node (e.g. O-RU), which the another entity is configured to obtain and store the cell data.

Figure 4:
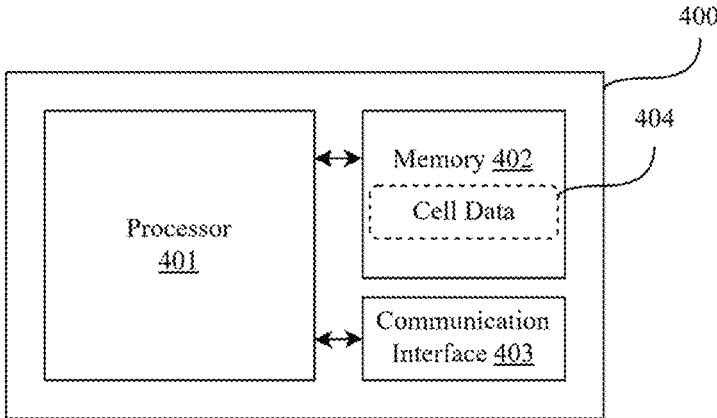
FIG. 4 shows an example of a device according to various examples in this disclosure.

FIG. 4 shows an example of a device 400 according to various examples in this disclosure. The device 400 is depicted as a communication device in this illustrative example, including a processor 401, a memory 402, and a communication interface 403 configured to receive and transmit communication signals in order to communicate with further entities within the mobile communication network. The communication interface 403 may include a transceiver. The processor 401 may include one or more processors which may include a baseband processor and an application processor. In various examples, the processor 401 may include a central processing unit, a graphics processing unit, a hardware acceleration unit, a neuromorphic chip, and/or a controller. The processor 401 may be implemented in one processing unit, e.g. a system on chip (SOC), or a processor. In accordance with various examples, the processor 401 may further provide further functions to process received communication signals. The memory 402 may store various types of information required for the processor 401, or the communication interface 403 to operate in accordance with various aspects of this disclosure.

The memory 402 may be configured to store cell data 404 representative of the one or more attributes associated with at least one state of the cell, such as conditions of the cell as exemplarily defined in accordance with FIG. 3. The processor 401 may have obtained the cell data 404 based on its operations, exemplarily as operations of a network access node serving terminal devices within the cell, by communicating with the terminal devices, or based on previous radio resource management operations for the cell. For example, the processor 401 may decode various messages received from terminal devices (e.g. UE reports, radio communication channel indicators and measurements associated with radio communication channels, UEInformationResponse) via the communication interface 403, by which the processor 401 may obtain through a collection of data, or via estimations, attributes associated with one or more states associated with radio communication resources.

Furthermore, the processor 401 may obtain, through execution of radio resource management operations (by the device 400 itself, or by another entity with which the device 400 may communicate via the communication interface 403), information with respect to user density, mobility of terminal devices, interference information, cell load of the cell, location of the cell, the topology associated with the location of the cell, mobility of terminal devices within the cell, which are served by the respective network access node, computing resources used by the respective network access node, and/or used by a radio resource managing entity associated with the network access node, in order to manage radio resources of the cell, and cross-interference. The processor 401 may also obtain the location information associated with the cell by the location of the device 400 (e.g. stored in the memory 402, or via a positioning (e.g. GPS) system) and respective topology associated with the location of the device 400. The processor 401 may further be configured to calculate or estimate past computing resources used to manage radio resources, in particular, in case the device 400 is also configured to implement the trained AI/ML model used to manage radio resources which will be referred to as the radio resource management model.

In various examples, the processor 401 may obtain the cell data 404 via the communication interface 403 by communicating with one or more other entities within the mobile communication network, and the one or more other entities may have obtained the respective information associated with the conditions of the cell similarly, as defined herein. In particular, the processor 401 may decode cell state information received from a further communication device that may implement the radio resource management model of the mobile communication network and store the decoded cell state information in the memory 402 as the cell data 404.

The processor 401 may control the exchange of information with further entities of the mobile communication network via the communication interface 403. In particular, in case the processor 401 obtains the cell data 404 by receiving information (e.g. cell state information) associated with the conditions of the cell, the processor 401 may encode requests for further entities that provide the information associated with the conditions of the cell, to receive and update the cell data 404 stored in the memory 402 from time to time (e.g. periodically, in response to a received request for determination of an update timescale, etc.).

Furthermore, in case the radio resource management (RRM) model is implemented by another entity, the processor 401 may encode/decode messages exchanged with the RRM model carrying information some of which are disclosed herein. For example, some aspects provided herein may include determinations based on model information representative of capabilities and/or requirements associated with the RRM model, such as minimum performance requirements for the respective RRM model. The performance requirements for the respective RRM model may be represented by various performance requirement parameters based on the respective algorithm (e.g. classification, regression, etc.) employed by the respective RRM model. In case the RRM model is also implemented by the device 400, the processor 401 may obtain the model information from the memory 402.

In some aspects, the device 400 may be a network access node, such as a base station. In some aspects, the device 400 may be an entity of the mobile communication network, which the device 400 may communicate with the respective network access node. In some aspects, within O-RAN context, the device 400 may include a RIC, such as a near real-time RIC or a non-real-time RIC. In some aspects, in which the RRM model is implemented by another entity, the device 400 may include a controller entity, such as a central unit or a distributed unit, and the RRM model may be implemented by a RIC. In some aspects, a near-real-time RIC may implement the RRM model and the device 400 may include the near-real-time RIC. In some aspects, a near-real-time RIC may implement the RRM model and the device 400 may include the non-real-time RIC.

For example, the model information may include parameters associated with a confusion matrix, a precision metric parameter, and/or a precision metric, for an RRM model employing a classification algorithm, while the model information may include parameters associated with a mean absolute error, a mean square error, or an r squared metric for an RRM model employing a regression algorithm. The parameters of the model information may include parameters defining a minima, a maxima, a threshold, etc. for the respective performance metric. Furthermore, the model information may include information representative of a plurality of predefined update timescales provided by the respective RRM model. For example, the respective RRM model may have certain limitations with respect to the update timescale, or the respective RRM model may be configured to suggest update timescales. Suggested update timescales may include predefined or predetermined update timescales by the RRM model or respective entity that may implement the RRM model. In accordance with various examples, the determination of the update timescale may include selecting one of the update timescales that an RRM model provides with the model information.

Furthermore, the entity that implements the RRM model (whether the device 400 itself or another device) may also provide information representative of the computing resources used by the RRM model (e.g. processor usage, memory usage, processor temperature, etc.). In various examples, the model information may include the information representative of the computing resources used by the RRM model.

Furthermore, some aspects provided herein may include determinations based on operator information representative of preferences of a mobile network operator (MNO) associated with the mobile network service provided by the cell. The MNO may prefer a radio resource management prioritizing power conservation over data throughput, or a radio resource management prioritizing data throughput over power conservation. Moreover, as the mobile communication network may include many cells of which radio resources are managed and/or many RRM models deployed to manage radio resources, the MNO may also prioritize or limit the determination of update timescales for particular cells or particular RRM models. Additionally, the MNO may also provide various limitations associated with the RRM model.

In accordance with various aspects provided herein, the device 400 may communicate via the communication interface 403 with an entity of the mobile communication network, which the entity may provide the operator information including information representative of above-mentioned preferences of the MNO. For example, the operator information may include information representing priority cells for which the update timescales are to be defined (e.g. an identifier for each priority cell), priority RRM algorithms which are to be caused to be updated according to the determined update timescales (e.g. an identifier for each priority RRM algorithm), a performance threshold, a computation overhead threshold, a weight parameter associated with the performance or computation of an RRM model, etc. The entity that provides the operator information may be an orchestrator entity of the mobile communication network (e.g. a service management and orchestration (SMO) entity in O-RAN).

The processor 401 may be configured to determine for the RRM model, an update timescale based on the cell data 404. The processor 401 may further be configured to cause the RRM model, for which the update timescale is determined, to update model parameters of the RRM model based on the determined update timescale. It is to be noted that the RRM model may be configured to provide an output including data that is used to manage radio resources of the cell of the mobile communication network (i.e. the cell of which the conditions are represented by the cell data 404) based on input data and model parameters of the RRM model. For example, for an RRM model that is an artificial neural network (ANN), the model parameters may include weight parameters and/or bias parameters that the ANN may use to obtain the output data according to the input data.

In order to cause the RRM model to update the RRM model, the processor 401 may communicate timescale information representative of the determined update timescale to the RRM model, and the RRM model may update model parameters based on the communicated timescale information. Timescale information may include information that triggers the RRM model to update (i.e. update now, or at the first possibility). In particular, when the RRM model is also implemented by the device 400, the processor 401 may simply send a control signal or control information to a controller of the RRM model that triggers an update operation based on the determined update timescale. When the RRM model is implemented by another entity, the processor 401 may encode the timescale information representative of the timing of the update (i.e. time information for one instance of time), or representative of the timing of more than one update (i.e. a plurality of time instances). The timescale information may further include a time period representative of a period based on which the RRM model is to be updated periodically (i.e. a period of 1 day, a period of 1 week, a period of 1 hour, etc.). In response to receiving the timescale information, the RRM model may initiate the update procedure based on the determined update timescale as represented by the timescale information.

The processor 401 may determine the update timescale for the RRM model based on the conditions of the cell, by predicting a performance metric for the communication operations within the cell based on the cell data 404. In accordance with various aspects provided herein, a performance metric may include data throughput within the cell. The data throughput may include a rate (an amount per each period of time) of data sent to terminal devices within the cell by the network access node, and/or a rate of the data received from terminal devices within the cell by the network access node, in which the sum of both rates may result in a system throughput or aggregate throughput that may also be referred to as the data throughput of the cell. For example, the cell data 404 may include information representative of the data throughput within the cell for a plurality of time instances, and as an exemplary prediction method, the processor 401 may predict the data throughput at a future instance of time based on the past data throughput within the cell for a plurality of past time instances using a regression model.

In accordance with various aspects provided herein, a performance metric may include power consumption associated with the cell. The power consumption may include a rate of power consumption by the network access node and/or a rate of power consumption by the entity that is configured to manage radio resources for the network access node, of which the sum of the rates may also be referred to as power consumption associated with the cell. For example, the cell data 404 may include information representative of the power consumption associated with the cell for a plurality of time instances, and as an exemplary prediction method, the processor 401 may predict a power consumption rate at a future instance of time based on the past power consumption associated with the cell for a plurality of past time instances using a regression model.

In accordance with various aspects provided herein, a performance metric may include cell load of the cell. The cell load may include a rate of used PRBs and/or available PRBs, or a rate of terminal devices that are connected to the network access node. For example, the cell data 404 may include information representative of the cell load of the cell for a plurality of time instances, and as an exemplary prediction method, the processor 401 may predict a cell load at a future instance of time based on the past cell load of the cell for a plurality of past time instances using a regression model.

In accordance with various aspects provided herein, a performance metric may include cell load of the cell. The cell load may include a rate of used PRBs and/or available PRBs, or a rate of terminal devices that are connected to the network access node. For example, the cell data 404 may include information representative of the cell load of the cell for a plurality of time instances, and as an exemplary prediction method, the processor 401 may predict a cell load at a future instance of time based on the past cell load of the cell for a plurality of past time instances using a regression model.

In accordance with various aspects provided herein, a performance metric may include computing resources used to manage radio resources. The computing resources used to manage radio resources may include computing resources used by the network access node (e.g. eNB, gNB, RU), or a radio resource managing entity (e.g. O-DU, O-CU, the entity that implements the RRM model), that is stored as part of the cell data 404. For example, the cell data 404 may include information representative of the used computing resources for the cell for a plurality of time instances, and as an exemplary prediction method, the processor 401 may predict a computing resource usage at a future instance of time based on used computing resources of the cell for a plurality of past time instances using a regression model.

Figure 5:
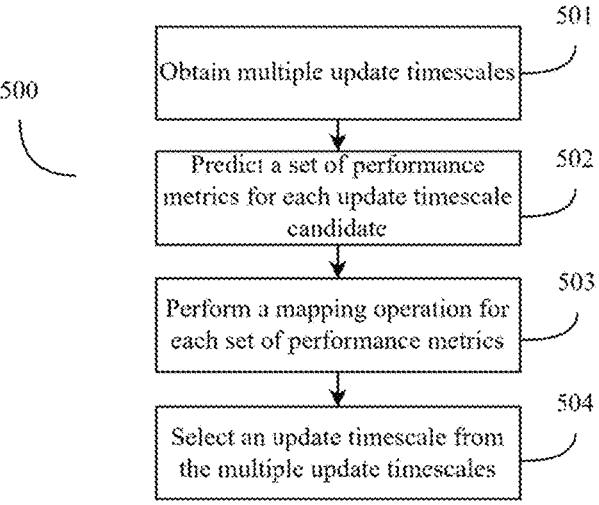
FIG. 5 shows an exemplary procedure to determine an update timescale.

FIG. 5 shows an exemplary procedure to determine an update timescale. A processor (e.g. the processor 401) may implement the procedure 500. The processor may obtain 501 multiple update timescales. For example, the multiple update timescales may include predefined update timescales stored in a memory (e.g. the memory 402). The predefined update timescales may be configured by an MNO or manually by a user according to expected outcomes or limitations with respect to the RRM model for which the update timescale is to be determined. In accordance with various aspects, the RRM model or the entity that implements the RRM model may send information representative of the multiple update timescales.

The processor may predict 502 a set of predetermined performance metrics for each update timescale candidate. For example, the MNO may indicate preference for performance metrics to be used by the processor via the operator information sent by the orchestrator entity. For this particular example, the operator information may indicate that the performance metrics to be used to determine the update timescale for the RRM are data throughput and computing resources used to manage radio resources. Accordingly, for each update timescale of the multiple update timescales, the processor may predict data throughput within the cell and computing resources used to manage radio resources of the cell based on the cell data using a prediction model (e.g. a regression model).

The instance of time for which each performance metric is predicted may be based on the respective update timescale. For example, for each update timescale candidate, the processor may predict data throughput within the cell at the time instance of the respective update timescale candidate and usage of computing resources (compute overhead) at the time instance of the respective update timescale candidate. Accordingly, the processor may obtain for each update timescale, a set of performance metrics that are, for this example, data throughput and compute overhead.

The processor may perform 503 a mapping operation based on each set of performance metrics predicted for one of the multiple update timescales to perform calculations. For example, the MNO may indicate preference of an objective for the calculations via the operator information. The objective may indicate how the performance metrics may relate to the determination procedure 500. In other words, the indicated objective may indicate a criterion (or criteria) to select one of the multiple update timescales. The MNO may indicate the objective by sending operator information representing a mathematical formula that is used to obtain a performance value based on parameters of the mathematical formula that are the predicted set of performance metrics. Alternatively, or additionally, the MNO may send a mapping table that matches a plurality of predefined performance metrics of the set of performance metrics.

For this illustrative example, the operator information includes information representing a mathematical formula based on a first parameter associated with a predicted data throughput and a second parameter associated with a predicted compute overhead. The processor may calculate a value using the mathematical formula for each set of predicted data throughput and predicted compute overhead for each update timescale candidate using the mathematical formula. The operator information may also include information representing the criterion as the maximum calculated value is to be selected.

The processor may accordingly select 504 one of the update timescales from the multiple update timescales based on the above-mentioned calculations and the criterion. In this illustrative example, the processor may obtain multiple values for the multiple update timescales, each value for each update timescale is obtained by performing a mapping operation according to the mathematical formula, that maps the respective predicted data throughput and the respective predicted compute overhead for the respective update timescale to the respective value. The processor may then select 504 the update timescale from the multiple update timescales. The update timescale may have the maximum obtained value, as indicated by the criterion. Accordingly, the determined update timescale is the selected update timescale.

Various aspects herein may utilize one or more artificial intelligence/machine learning models (AI/ML) model to determine an update timescale in accordance with various aspects of this disclosure. The term "model" used herein may be understood as any kind of algorithm, which provides output data based on input data provided to the model (e.g., any kind of algorithm generating or calculating output data based on input data).

The device 400 may implement the AI/ML. The device 400 may be a computing device or an apparatus suitable for implementing the AI/ML. The processor 401, or another processor as provided in this disclosure may implement the AI/ML. According to various aspects of this disclosure, other types of AI/ML implementations may include a further processor that may be internal or external to the processor (e.g. an accelerator, a graphics processing unit (GPU), a neuromorphic chip, etc.), or a memory may also implement the AI/ML. The AI/ML may be configured to provide output data based on input data and AI/ML parameters (model parameters). The AI/ML may include a trained AI/ML, in which the AI/ML parameters are configured according to a training process for the purpose of determining an update timescale parameter based on received input data based on the cell data. A trained AI/ML may include an AI/ML which is trained prior to an inference to obtain output data. A trained AI/ML may further include an AI/ML which is trained based on the output data obtained via AI/ML (i.e. optimizations). In various aspects, AI/ML parameters include parameters configured to control how the input data may be transformed into output data. AI/ML parameters may further include hyperparameters configured to control how the AI/ML performs learning (e.g. learning rate, number of layers, classifiers, etc.).

Figure 6:
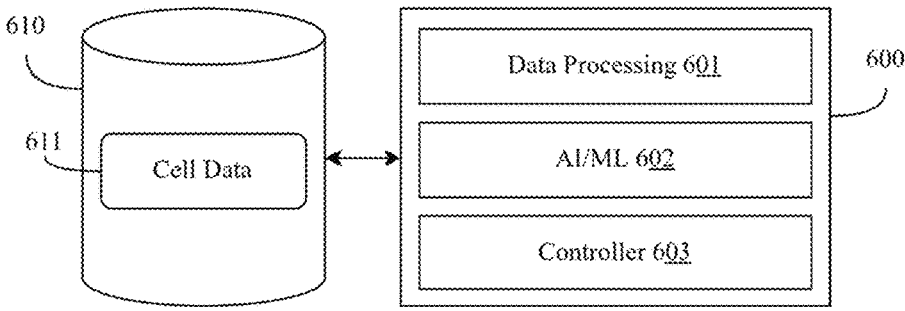
FIG. 6 shows an example of a processor and a memory of a device according to various aspects provided in this disclosure.

FIG. 6 shows an example of a processor and a memory of a device according to various aspects provided in this disclosure. The processor 600 is depicted to include various functional units that are configured to provide various functions as disclosed herein, associated with a processor (e.g. the processor 401) that may be used within a device (e.g. the device 400). The skilled person would recognize that the depicted functional units are provided to explain various operations that the processor 600 may be configured to perform. Similarly, the memory 610 is depicted to include the cell data 611 as a block, however, the memory may store the cell data 611 in any kind of suitable configuration or mechanism. Furthermore, the AI/ML unit 602 is depicted as it is implemented in the processor 600 only as an example, and any type of AI/ML implementation which may include the implementation of the AI/ML in an external processor, such as an accelerator, a graphics processing unit (GPU), a neuromorphic chip, or in a cloud computing device, or in an external communication device may also be possible according to any methods.

The processor 600 may include a data processing module 601 that is configured to process data and obtain at least a portion of the cell data 611 as provided in various examples in this disclosure to be stored in the memory 610. In various examples, the cell data 611 may include information for the past conditions of the cell for at least within a period of time in a plurality of instances of time (e.g. as a time-series data). The data processing module 601 may obtain at least a portion of the cell data 611 according to the operations of the device.

The AI/ML unit 602 may implement an AI/ML. The AI/ML may be configured to receive input data with certain constraints, features, and formats. Accordingly, the data processing module 601 may obtain input data, that is based on the cell data 611, to be provided to the AI/ML to obtain an output of the AI/ML. In various examples, the data processing module 601 may provide input data including the cell data 611 to the AI/ML. The input data may include attributes of the cell data 611 associated with a period of time or a plurality of consecutive periods of time. In various examples, the data processing module 601 may convert the cell data 611 to an input format suitable for the AI/ML (e.g. input feature vectors) so that the AI/ML may process the cell data 611. The processor 600 may further include a controller 603 to control the AI/ML module 602. The controller 603 may provide the input data to the AI/ML, or provide the AI/ML module 602 instructions to obtain the output. The controller 603 may further be configured to perform further operations of the processor 600 or the device associated with the processor in accordance with various aspects of this disclosure, such as encoding timescale information or causing the RRM model to be updated.

The AI/ML may be any type of machine learning model configured to receive the input data and provide an output as provided in this disclosure. The AI/ML may include any type of machine learning model suitable for the purpose. The AI/ML may include a decision tree model or a rule-based model suitable for various aspects provided herein. The AI/ML may include a neural network. The neural network may be any type of artificial neural network. The neural network may include any number of layers, including an input layer to receive the input data, an output layer to provide the output data. A number of layers may be provided between the input layer and the output layer (e.g. hidden layers). The training of the neural network (e.g., adapting the layers of the neural network, adjusting AI/ML parameters) may use or may be based on any kind of training principle, such as backpropagation (e.g., using the backpropagation algorithm).

For example, the neural network may be a feed-forward neural network in which the information is transferred from lower layers of the neural network close to the input to higher layers of the neural network close to the output. Each layer may include neurons that receive input from a previous layer and provide an output to a next layer based on certain AI/ML (e.g. weights) parameters adjusting the input information.

The AI/ML may include a recurrent neural network in which neurons transfer the information in a configuration in which the neurons may transfer the input information to a neuron of the same layer. Recurrent neural networks (RNNs) may help to identify patterns between a plurality of input sequences, and accordingly, RNNs may be used to identify, in particular, a temporal pattern provided with time-series data and perform estimations based on the identified temporal patterns. In various examples of RNNs, long short-term memory (LSTM) architecture may be implemented. The LSTM networks may be helpful to perform classifications, and processing, and estimations using time series data.

An LSTM network may include a network of LSTM cells that may process the attributes provided for an instance of time as input data, such as attributes provided for the instance of time, and one or more previous outputs of the LSTM that have taken in place in previous instances of time, and accordingly, obtain the output data. The number of the one or more previous inputs may be defined by a window size, and the weights associated with each previous input may be configured separately. The window size may be arranged according to the processing, memory, and time constraints and the input data. The LSTM network may process the features of the received raw data and determine a label for an attribute for each instance of time according to the features. The output data may include or represent a label associated with the input data.

In various examples, the neural network may be configured in top-down configuration in which a neuron of a layer provides output to a neuron of a lower layer, which may help to discriminate certain features of an input.

In accordance with various aspects, the AI/ML may include a reinforcement learning model. The reinforcement learning model may be modeled as a Markov decision process (MDP). The MDP may determine an action from an action set based on a previous observation which may be referred to as a state. In a next state, the MDP may determine a reward based on the current state that may be based on current observations and the previous observations associated with previous state. The determined action may influence the probability of the MDP to move into the next state. Accordingly, the MDP may obtain a function that maps the current state to an action to be determined with the purpose of maximizing the rewards. Accordingly, input data for a reinforcement learning model may include information representing a state, and an output data may include information representing an action.

The AI/ML may include a convolutional neural network (CNN), which is an example for feed-forward neural networks that may be used for the purpose of this disclosure, in which one or more of the hidden layers of the neural network include one or more convolutional layers that perform convolutions for their received input from a lower layer. The CNNs may be helpful for pattern recognition and classification operations. The CNN may further include pooling layers, fully connected layers, and normalization layers.

The AI/ML may include a generative neural network. The generative neural network may process input data in order to generate new sets, hence the output data may include new sets of data according to the purpose of the AI/ML. In various examples, the AI/ML may include a generative adversarial network (GAN) model in which a discrimination function is included with the generation function, and while the generation function may generate the data according to model parameters of the generation function and the input data, the discrimination function may distinguish the data generated by the generation function in terms of data distribution according to model parameters of the discrimination function. In accordance with various aspects of this disclosure, a GAN may include a deconvolutional neural network for the generation function and a CNN for the discrimination function.

The AI/ML may include a trained AI/ML that is configured to provide the output as provided in various examples in this disclosure based on the input data and one or more AI/ML parameters obtained by the training. The trained AI/ML may be obtained via an online and/or offline training. A training agent may perform various operations with respect to the training at various aspects, including online training, offline training, and optimizations based on the inference results. The AI/ML may take any suitable form or utilize any suitable technique for training process. For example, the AI/ML may be trained using supervised learning, semi-supervised learning, unsupervised learning, or reinforcement learning techniques.

In supervised learning, the AI/ML may be obtained using a training set of data including both inputs and corresponding desired outputs (illustratively, input data may be associated with a desired or expected output for that input data). Each training instance may include one or more input data item and a desired output. The training agent may train the AI/ML based on iterations through training instances and using an objective function to teach the AI/ML to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

The training agent may adjust the AI/ML parameters of the respective model based on outputs and inputs (i.e. output data and input data). The training agent may train the AI/ML according to the desired outcome. The training agent may provide the training data to the AI/ML to train the AI/ML. In various examples, the processor and/or the AI/ML unit itself may include the training agent, or another entity that may be communicatively coupled to the processor may include the training agent and provide the training data to the device, so that the processor may train the AI/ML.

In various examples, the device may include the AI/ML in a configuration that it is already trained (e.g. the AI/ML parameters in a memory are already set for the purpose). It may desirable for the AI/ML itself to have the training agent, or a portion of the training agent, in order to perform optimizations according to the output of inferences as provided in this disclosure. The AI/ML may include an execution unit and a training unit that may implement the training agent as provided in this disclosure for other examples. In accordance with various examples, the training agent may train the AI/ML based on a simulated environment that is controlled by the training agent according to similar considerations and constraints of the deployment environment.

For example, the training input data may include, or may be based on, training cell data generated or obtained to represent various states of a cell (or of a plurality of cells). The training cell data may include information representative of one or more attributes designated to represent various conditions of a cell. Each training input data item may include cell data associated with conditions of a cell for an instance of a period of time. Training input data may further include training output data associated with the training input data representing desired outcomes with respect to each set of training input data. Training output data may indicate, or may represent, the desired outcome with respect to training input data, so that the training agent may provide necessary adjustments to respective AI/ML parameters in consideration of the desired outcome.

In other words, training cell data may include a plurality of data sets, in which each data set is representative of the conditions of a cell and an output data associated with the conditions of the cell represented by the respective data set. The skilled person would immediately recognize that the exemplary AI/ML disclosed herein is explained that may have many configurations, but in implementation, the AI/ML is to be configured to receive input data based on designated attributes that are representative of the conditions of the cell and to provide output data including designated parameters. Accordingly, each data set of the training cell data for that particular AI/ML may include training inputs based on the same designated attributes that are representative of various conditions of a cell or various cells, and the respective output data including the same designated attribute.

For example, for an AI/ML that is configured to receive input data based on the attributes of user density within the cell, location of the cell, load of the cell, mobility of terminal devices within the cell, interference patterns, and to provide output data that is representative of a predicted data throughput and compute overhead, each data set of the training cell data may include a training input data based on predefined attributes representative of a user density within a cell, a location for the cell, a load of the cell, a mobility of terminal devices within a cell, a mobility of terminal devices within the cell, interference patterns, and a training output data representative of the data throughput and the compute overhead. By inferencing for each training input data, the training agent may adjust the AI/ML parameters of the AI/ML based on a predicted output by the AI/ML and the training output data based on an objective function. In various aspects provided herein, the objective function may be a mathematical function (i.e. a mapping operation that maps parameters to, for example, a value) based on performance metrics (i.e. predicted performance metrics and observed performance metrics) such as a loss function or a reward function.

Furthermore, in accordance with various aspects provided herein, the AI/ML may also be configured in a manner that the input data may further include one or more predetermined update timescales (e.g. predefined update timescales, suggested update timescales), and the AI/ML may be configured to provide output data based on the one or more predetermined update timescales. Accordingly, each training input data may further include one or more designated update timescales, and the respective training output data may include one or more data items that are representative of output data for the one or more designated update timescales. In line with the above-mentioned example in which the training output data is representative of a data throughput and a compute overhead, accordingly the training output data may include one or more data items, each is representative of a data throughput and a compute update for each respective one or more designated update timescales (e.g. an observed data throughput and compute overhead after a period of time that is based on, or at, a respective designated update timescale of the one or more designated update timescales).

In other words, the training agent may train the AI/ML by providing training input data to the input of the AI/ML and it may adjust AI/ML parameters of the AI/ML based on the output of the AI/ML and training output data associated with the provided training input data with an intention to make the output of the AI/ML more accurate. Accordingly, the training agent may adjust one or more AI/ML parameters based on a calculation including parameters for the output of the AI/ML for the training input data and the training output data associated with the training input data. In various examples, the calculation may also include one or more parameters of the AI/ML. With each iteration with respect to the training input data that may include many data items, which each data item may represent an input of an instance (of time, of observation, etc.) on various aspects and each iteration may iterate a respective data item representing an input of an instance, the training agent may accordingly cause the AI/ML to provide more accurate output through adjustments made in the AI/ML parameters.

The processor 600 may implement the training agent, or another entity that may be communicatively coupled to the processor 600 may include the training agent and provide the training input data to the device, so that the processor 600 may train the AI/ML. In various examples, the device may include the AI/ML in a configuration that it is already trained (e.g. the machine model parameters in the memory are set). It may desirable for the AI/ML itself to have the training agent, or a portion of the training agent, in order to perform optimizations according to the output of the inferences to be performed as provided in this disclosure. The AI/ML may include an execution unit and a training unit that may implement the training agent as provided in this disclosure for other examples.

Furthermore, the controller 603 may control the AI/ML unit 602 according to a predefined event. For example, the controller 603 may provide instructions to the AI/ML unit 602 to perform the AI/ML in response to a received request from another entity. The controller 603 may further obtain output of the AI/ML from the AI/ML unit 602 and determine the update timescale according to the output of the AI/ML. In accordance with various aspects provided herein, the controller 603 may determine the update timescale based on the output of the AI/ML and based on further the operator information and the model information.

Figure 7:
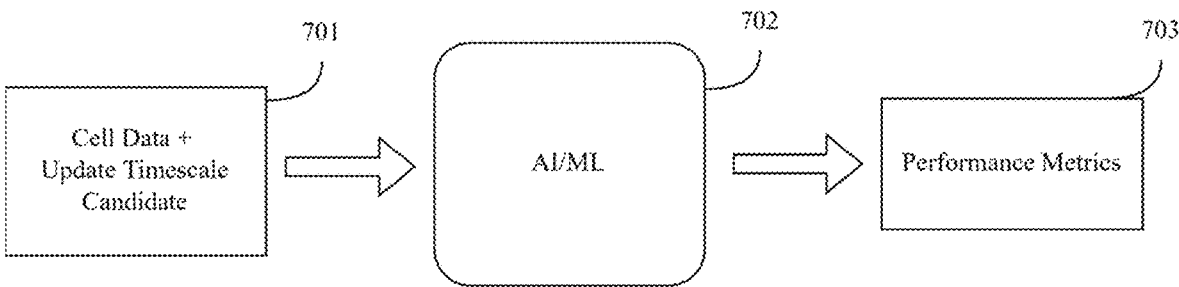
FIG. 7 shows an example of an AWL.

FIG. 7 shows an example of an AI/ML. The AI/ML 702 may be configured to receive input data 701 that is based on cell data and one or more update timescale candidates, as provided in various aspects of this disclosure. The input data 701 may include the cell data and the one or more update timescale candidates or the input data 701 may include information that is based on the cell data and the one or more update timescale candidates that are transformed into a format that is suitable as input data for the AI/ML 702, such as input feature vectors associated for attributes of the cell data and the one or more update timescale candidates.

For example, the cell data may include user density of a cell for multiple past time instances (i.e. user density history), location of the cell and the terrain associated with the location of the cell, load of the cell for multiple past time instances (i.e. load history), average mobility of terminal devices within the cell, interference parameters representative of cross-interference from neighboring cells to the cell, as a time-series data. Accordingly, the input data 701 may include, based on the designated format of input data that the AI/ML 702 is configured to receive, for example, input features as vectors, in which each input feature vector is representative of the cell data for a particular instance of time. Furthermore, the input data may also include one update timescale from the one or more update timescale candidates.

The AI/ML 702 may be configured provide an output 703 that is indicative or representative of one or more predicted performance metrics according to the input update timescale. In an illustrative example, the output 703 of the AI/ML 702 may include a first performance metric that is representative of data throughput within the cell after a period of time that is based on, or equal to, the input update timescale, and a second performance metric that is representative of an overhead associated with the cell after the period of time that is based on, or equal to, the input update timescale. For example, the second performance metric may be representative of a compute overhead, or a power overhead representing predicted power consumption to manage radio resources of the cell.

Accordingly, a processor (e.g. the processor 600) may control an AI/ML unit (e.g. the AI/ML unit 602) to obtain an output for each update timescale of a plurality of update timescales. The skilled person would recognize that the AI/ML 702 may receive input representative of a plurality of update timescales, and provide an output representative of predicted performance metrics for each one of the plurality of update timescales in a single execution, for example as a multi-step predicter AI/ML.

Based on the plurality of predicted performance metrics for the plurality of update timescales, the processor may determine the update timescale for the respective RRM model configured to manage radio resources of the cell, by selecting one of the plurality of update timescales according to predicted performance metrics using the operator information that indicates the preference of the MNO. In accordance with various aspects provided herein, the MNO may indicate preference of an objective for the calculations via the operator information.

The objective provided herein may include information representative of a mathematical function that maps the first predicted performance metric and the second predicted metric for an update timescale candidate to a value (e.g. a score), and may include a selection of an update timescale as the determined update timescale from the plurality of update timescales that maximizes the mapped value. For example, an exemplary simple mathematical function may be $S_i=w_1*P_{1,i}-w_2*P_{2,i}$ where $S_i$ denotes the score of i-th update timescale, $P_{1,i}$ denotes the first predicted performance metric for the i-th update timescale, $P_{2,i}$ denotes the second predicted performance metric for the i-th update timescale, and $w_1$ and $w_2$ denote weights for the first predicted performance metric and the second predicted performance metric respectively. Accordingly, the processor may perform a mapping operation for each first predicted performance metric and second predicted performance metrics for each update timescale of the plurality of update timescales, and select the update timescale that maximizes the mapped value as the determined update timescale for the RRM.

Accordingly, the processor may perform a mapping operation for each update timescale of the plurality of update timescales to map obtained performance metrics for the respective update timescale to a value to perform calculations. Then, based on the selection criterion (e.g. select the update timescale that returns the maximum value or the minimum value), the processor may select one of the update timescales as the determined update timescale for the RRM.

In accordance with various aspects provided herein, the objective information may further include information representing one or more thresholds for predicted performance metrics. Accordingly, the processor may determine the update timescale based on the information representing one or more thresholds for predicted performance metrics, for example, by selecting an update timescale from update timescale candidates for which performance metrics are predicted below or above the one or more thresholds.

In various examples, the processor may also be configured to implement the RRM model. The details of the RRM model are not included in this disclosure for brevity, but exemplarily, the processor may implement the RRM model including another AI/ML model that is functionally and structurally similar to the AI/ML implemented in AI/ML unit 602. Accordingly, any of the disclosures provided herein with respect to the AI/ML unit 602 and/or the respective AI/ML (e.g. the AI/ML 702) used to determine update timescale, may also be considered for the RRM model. The skilled person would recognize the difference, in particular with respect to the input and output of the RRM model, and accordingly the training of the RRM model. An RRM model may be configured to receive input data designated according to any known RRM models and provide output data that is used to manage the radio resources of the cell.

Figure 8:
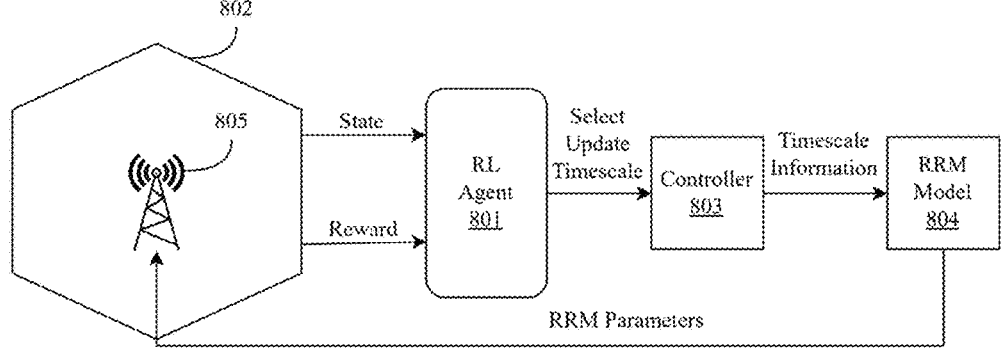
FIG. 8 shows an exemplary representation of a reinforcement learning model based AWL.

FIG. 8 shows an exemplary representation of a reinforcement learning model based AI/ML, that a processor (e.g. the processor 600) may implement. A reinforcement learning agent (RL agent) 801 (e.g. the AI/ML unit 602) may determine an action based on a first observation (i.e. state) made for the observation environment and model parameters of the RL model. An observation may be the conditions of a cell 802 served by a network access node 805 associated with a first instance of time. In this illustrative example, the cell data may exemplarily include downlink/uplink PRB usage, number of terminal devices that are in RRC_Connected mode within the cell, number of active terminal devices (e.g. that use radio resources over a predefined threshold), channel information for radio communication channels between the network access node 805 and terminal devices (e.g. user channel quality summary provided by the network access node 805), time of the day, etc.

The RL agent 801 may also obtain a first reward for the first instance of time with respect to a transition from a previous instance of time to the first instance of time, that may be represented by the first observation. For example, the RL agent 801 may determine the action which may include a selection of an update timescale from a plurality of update timescales for an RRM model 804 that is used to manage radio resources of the cell 802. The RRM model 804 may have provided information representative of the plurality of update timescales. Exemplarily, the plurality of update timescales may include a timescale of 12 hours, 1 day, 1 week, 2 weeks, 1 month, etc.

The RL agent 801 may, based on the first observation, map the state represented with the first observation (i.e. the cell data at a first instance of time) to one of the plurality of update timescales that maximizes the reward according to the estimation of the RL agent 801 according to the model parameters of the RL model. Accordingly, the RL agent 801 may output the selected update timescale to a controller 803 (e.g. the controller 603). The controller 803 may cause the RRM model 804 to be updated (to be re-trained or further trained) according to the selected update timescale by encoding timescale information to be sent to the RRM model. Accordingly, the RRM model 804 may update the model parameters of the RRM model 804 and start to configure radio resources for the cell 802 by sending radio resource managing parameters to the network access node 805 which may manage the radio resources of the cell 802 accordingly, that eventually moves the state of the cell 802 to a further state.

At a second instance of time, the RL agent 801 may obtain a second reward with respect to the selected update timescale for the first instance of time for the transition from the first instance of time to the second instance of time with the selected update timescale. Based on the second reward, the RL agent 801 may update the model parameters of the RL model to be used for a further selection of an update timescale that may be based on a second observation at the second instance of time or a further instance of time. With each iteration for a new state and reward associated with the transition to the new state, the RL agent 801 may learn or optimize the policy used to map the observations to the selection of the update timescale.

In one example, the reinforcement learning model may be based on Q-learning to provide the output in the particular state represented by the input according to a Q-function based on AI/ML parameters. The Q-function may be represented with an equation: $Q_{new}(s_t, a_t) \leftarrow (1-\alpha) Q(s_t,a_t)+\alpha(r+\gamma \max a(Q(s_{t+1},a)))$ such that, s representing the state (observation) and a representing a selected update timescale, representing all state-action pairs (observation-selected update timescale pairs) with an index t, the new Q value of the corresponding state-action pair t is based on the old Q value for the state-action pair t and the sum of the reward r obtained by selecting the update timescale $a_t$ in the state $s_t$ with a discount rate $\gamma$ that is between 0 and 1, in which the weight between the old Q value and the reward portion is determined by the learning rate $\alpha$.

The discount factor may determine the importance of future rewards. A discount factor of 0 can make the agent "myopic" (or short-sighted) by only considering current rewards, while a factor close to 1 can make the agent strive for a long-term high reward. If the discount factor meets or exceeds 1, the action values may diverge, $\gamma=1$, all environment histories can become infinitely long, and utilities with additive, undiscounted rewards generally become infinite. Even with a discount factor only slightly lower than 1, Q-function learning leads to propagation of errors and instabilities when the value function is approximated with an artificial neural network. In that case, starting with a lower discount factor and increasing the discount value towards a final value may accelerate the learning.

In relation to the classification associated with selecting the update timescale using Q-learning the reward may be optimal data throughput and overhead (i.e. the compute overhead or power consumption overhead). One way of implementing Q-learning may include using Q-tables. The RL-agent 801 may use a Q table with initial values as 0s or any other value. The states may include the cell data. During the training, Q table is updated with appropriate values. During the inferencing phase, update timescales are inferred from the Q-table.

In accordance with various aspects provided herein, observations may include information included in the cell data. In particular, any combination of attributes represented by the cell data, such as user density, location of the cell, load of the cell, mobility of terminal devices within the cell, interference patterns can be used as input. In any example associated with usage of an AI/ML, that may also include the RL, any type of information that may infer the conditions of the cell may be used, such as a number or size of used radio communication resources to communicate within the cell, a number of terminal devices served by the network access node of the cell, computing services associated with the cell and a number of terminal devices that have used each computing service, a number of terminal devices having network traffic over a predefined threshold, communication channel information representative of attributes of the communication channel for each terminal device served by the network access node of the cell, time information representative of the period of time for each of the one or more attributes, channel information including at least one of channel quality information associated with the terminal devices, and reference signal strength indicators or reference signal received power measurements of respective established communication channels with the terminal devices, etc. Provided that the respective AI/ML is configured to provide an output based on received input data including such information, exemplarily trained using the corresponding training data and the structure of the respective AI/ML (e.g. layers, activation functions, etc.) are configured accordingly.

The RL agent 801 may accordingly, based on an observation representative of cell conditions after the update of the RRM model according to the selected update timescale, update expected rewards (e.g. update a reward function, or update Q-table) for learning. Furthermore, based on the observations representing the state, the RL agent 801 may select the update timescale that maximizes the reward expected from the selected update timescale based on the reward function or Q-table.

In various examples, the rewards may be calculated based on the disclosed herein observations using the reward function. In accordance with various aspects, the RL agent 801 may select the update timescale from the candidate update timescales using Q-tables. Q-tables may include information representing an expected reward for each update timescale candidate that can be selected according to the state represented by the observations.

In various examples, the reward function or Q-table may include parameters based on predetermined performance metrics, such as cell throughput within the cell and overhead (i.e. power consumption overhead and/or compute overhead). An exemplary reward function may be formulated as $R_i=w_1*P_{1,i}-w_2*P_{2,i}$ where $R_i$ denotes the reward of i-th transition from an instance of time to another instance of time, $P_{1,i}$ denotes the first measured performance metric for the i-th transition, $P_{2,i}$ denotes the second measured performance metric for the i-th transition, and $w_1$ and $w_2$ denote weights for the first measured performance metric and the second measured performance metric respectively. By arranging the respective weights, an optimum balance may be desired. In accordance with various aspects, the processor may set the respective weights based on operator information representative of the preference of MNO. Accordingly, in various examples, the observations associated with a transition from an instance of time to another instance of time may further include performance information representative of data throughput obtained within the cell according to previously selected update timescale, and overhead information representative of power consumption overhead or compute overhead obtained to manage radio resources of the cell according to previously selected update timescale.

In accordance with various aspects provided herein, a device (e.g. the device 400) may include the RL agent 801 and the controller 803, and the device 400 may further include the RRM model 804. The device may also include the network access node 802. In various examples, a device may include the RL agent 801, the network access node 802, and the controller 803, and the device may be communicatively coupled to a further entity that implements the RRM model 804. In various examples, the device may include the RL agent 801 and the controller 803, and may be communicatively coupled to a further entity may include the network access node 802 and the RRM model 804. In various examples, the device may include the RL agent 801 and the controller 803, and the device may be communicatively coupled to a first entity that includes the network access node 802 and a second entity that implements the RRM model 804.

In accordance with various aspects of this disclosure, the AI/ML may include a multi-armed bandit reinforcement learning model. In multi-armed bandit reinforcement learning models, the model may test available actions (e.g. a plurality of update timescale within the set of actions for the RL) at substantially equal frequencies. With each iteration, the AI/ML may adjust the machine learning model parameters to select actions that are leading better total rewards with higher frequencies at the expense of the remaining selectable actions, resulting in a gradual decrease with respect to the selection frequency of the remaining selectable actions, and possibly replace the actions that are gradually decreased with other selectable actions. In various examples, the multi-armed bandit RL model may select the actions irrespective of the information representing the state. The multi-armed RL model may also be referred to as one-state RL, as it may be independent of the state.

Accordingly, with respect to examples provided in this section, the AI/ML may include a multi-armed bandit reinforcement learning model configured to select actions without any information indicating the state, in particular with an intention to explore rewards associated with the selection of an update timescale according to a state. It is to be recognized that the benefit obtained with arbitrary selection may have long-term benefits due to the learning of the associated outcome, but not for selecting the optimum update timescale. In order to obtain a balance between exploring (e.g. arbitrary selection) and exploitation (e.g. selecting an update timescale that maximizes the reward according to current model parameters), the RL agent may be configured to perform an epsilon-greedy selection.

In accordance with various aspects provided herein, the AI/ML may include an RL model configured to perform an epsilon-greedy selection. The RL model may operate exemplarily as explained with respect to FIG. 8, with a difference in that the RL agent 801 may select an update timescale from the plurality of update timescales for exploration with a probability of $\in$, and the RL agent 801 may select an update timescale from the plurality of update timescales for exploitation with a probability of $1-\in$ that maximizes the reward. For this purpose, the processor may define $\in$ to the RL agent 801. In various examples, $\in$ may be determined by the orchestrator entity of the mobile communication network within operator information.

The processor may generate a random number for each selection of an update timescale, and the RL agent 801 may determine whether to select an update timescale for exploitation or to select an update timescale for exploration based on the generated random number and $\in$. For example, the generated random number may be 0 and 1, and the RL agent 801 may select an update timescale for exploration if the generated random number is equal or smaller than $\in$. If the generated random number is greater than $\in$, the RL agent 801 may select an update timescale that maximizes the reward.

Figure 9:
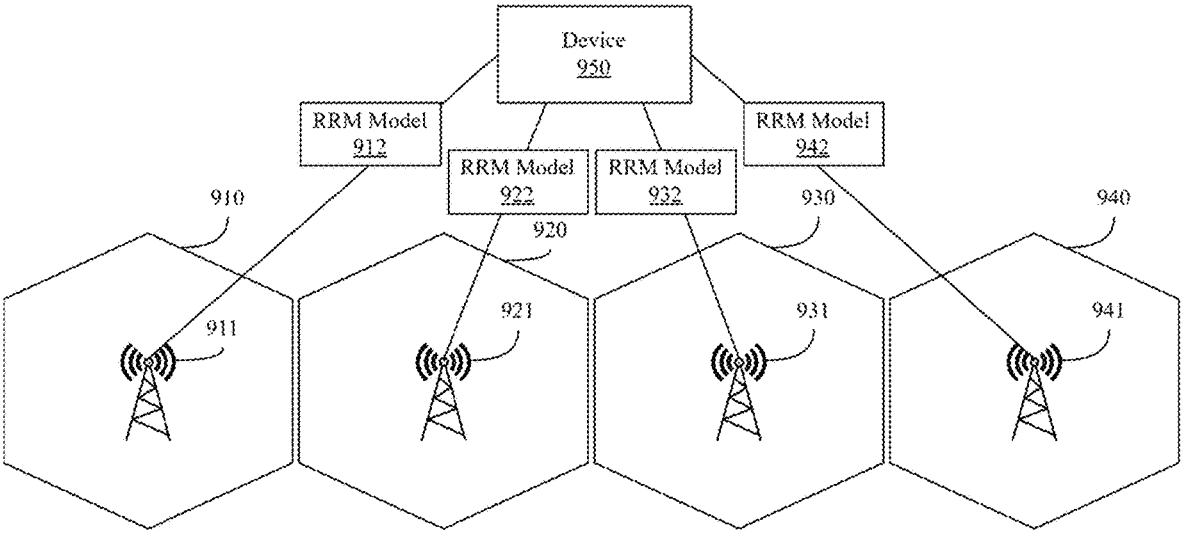
FIG. 9 shows an exemplary illustration of a device configured to determine update timescales for multiple RRM models

FIG. 9 shows an exemplary illustration of a device configured to determine update timescales for multiple RRM models. The device 950 may be a device (e.g. the device 400) configured to determine an update timescale based on the conditions of a cell. In this example, the device 950 may communicate with a plurality of RRM models 912, 922, 932, 942 (i.e. with entities that implement the plurality of RRM models). An entity or a plurality of entities of the mobile communication network may implement the plurality of RRM models 912, 922, 932, 942. Each RRM model may be configured to provide at least one output parameter used to manage radio resources of a cell (RRM parameter) based on input data including one or more attributes associated with the respective cell.

In this illustrative example, a first RRM model 912 may be configured to determine an RRM parameter for a first cell 910, and a first network access node 911 may receive the determined RRM parameter and manage radio resources of the first cell 910 according to the determined RRM parameter for the first cell 910. A second RRM model 922 may be configured to determine an RRM parameter for a second cell 920, and a second network access node 921 may receive the determined RRM parameter and manage radio resources of the second cell 920 according to the determined RRM parameter for the second cell 920. A third RRM model 932 may be configured to determine an RRM parameter for a third cell 930, and a third network access node 931 may receive the determined RRM parameter and manage radio resources of the third cell 930 according to the determined RRM parameter for the third cell 930. A fourth RRM model 942 may be configured to determine an RRM parameter for a fourth cell 940, and a fourth network access node 941 may receive the determined RRM parameter and manage radio resources of the fourth cell 940 according to the determined RRM parameter for the fourth cell 940.

The device 950 may include a processor (e.g. the processor 401). The processor may, instead of determining an update timescale for each RRM model, the processor may determine an update timescale for a set of cells. For this purpose, the processor may select the set of cells for which the processor may determine an update timescale. Each set of cells may be referred to as a cluster of cells. In various examples, the MNO may indicate cells within each cluster by sending operator information including information representing cell identifiers or RRM model identifiers for a cluster or for each cluster.

The device 950 may obtain cell data that is representative of conditions of a cell for each cell 910, 920, 930, 940 by exchanging information with the entity that implements the respective RRM model 912, 922, 932, 942, and/or by exchanging information with the respective network access node 911, 921, 931, 941. In various examples, the processor may select cells from the cells 910, 920, 930, 940 based on similarities of at least one attribute associated with the conditions of each cell 910, 920, 930, 940. For example, the processor may cluster cells that have similar computing resources, and/or that have similar user densities, and/or that have similar cell loads, etc. The processor may use any known method to determine the similarity.

In this illustrative example, assuming that the processor has determined to group the first cell 910 and the second cell 920 into a first cluster, and to group the third cell 930 and the fourth cell 940 into a second cluster, the processor may, based on the cell data of the first cell 910 and the cell data of the second cell 920, determine a first update timescale, and the processor may, based on the cell data of the third cell 930 and the cell data of the fourth cell 940, determine a second update timescale. Accordingly, the device 950 may cause the first RRM model 912 and the second RRM model 922 to be updated based on the first update timescale, and the device 950 may cause the third RRM model 932 and the fourth RRM model 942 to be updated based on the second update timescale.

Figure 10:
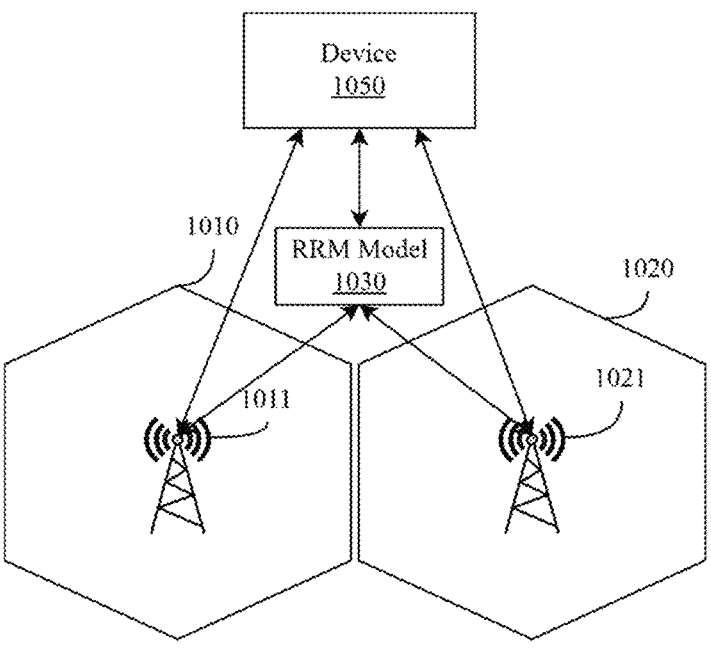
FIG. 10 shows an exemplary illustration of a device configured to determine an update timescale for multiple cells.

FIG. 10 shows an exemplary illustration of a device configured to determine an update timescale for multiple cells. The device 1050 may be a device (e.g. the device 400) configured to determine an update timescale based on conditions of a cell. In this example, the device 1050 may communicate with an RRM model 1030 (i.e. with an entity that implements the RRM model 1030). The RRM model 1030 may be configured to provide output parameters, each parameter (RRM parameter) used to manage radio resources of one of the cells of a plurality of cells based on input data including one or more attributes associated with the respective cell.

In this illustrative example, the RRM model 1030 may be configured to determine a first RRM parameter for a first cell 1010, and a first network access node 1011 may receive the first determined RRM parameter and manage radio resources of the first cell 1010 according to the first determined RRM parameter for the first cell 1010. The RRM model 1030 may be configured to determine a second RRM parameter for a second cell 1020, and a second network access node 1021 may receive the second determined RRM parameter and manage radio resources of the second cell 1020 according to the second determined RRM parameter for the second cell 1020.

The device 1050 may include a processor (e.g. the processor 401). The processor may determine one update timescale for a set of cells. For this purpose, the processor may select the set of cells for which the processor may determine an update timescale. Each set of cells may be referred to as a cluster of cells. In various examples, the MNO may indicate cells within each cluster by sending operator information including information representing cell identifiers or RRM model identifiers for a cluster or for each cluster. In various examples, the set of cells may be predetermined and stored in a memory of the device 1050.

The device 1050 may obtain cell data that is representative of conditions of a cell for each cell 1010, 1020, by exchanging information with the entity that implements the RRM model 1030, and/or by exchanging information with the respective network access node 1011, 1021. In various examples, the processor may select cells from the cells based on similarities of at least one attribute associated with the conditions of each cell 1010, 1020. For example, the processor may cluster cells that have similar computing resources, and/or that have similar user densities, and/or that have similar cell loads, etc. The processor may use any known method to determine the similarity.

In this illustrative example, the processor may determine, based on the cell data of the first cell 1010 and the cell data of the second cell 1020, one update timescale for the RRM model 1030 used to manage the radio resources of the first cell 1010 and the second cell 1020. Accordingly, the device 1050 may cause the RRM model 1030 to be updated based on the determined update timescale.

Figure 11:
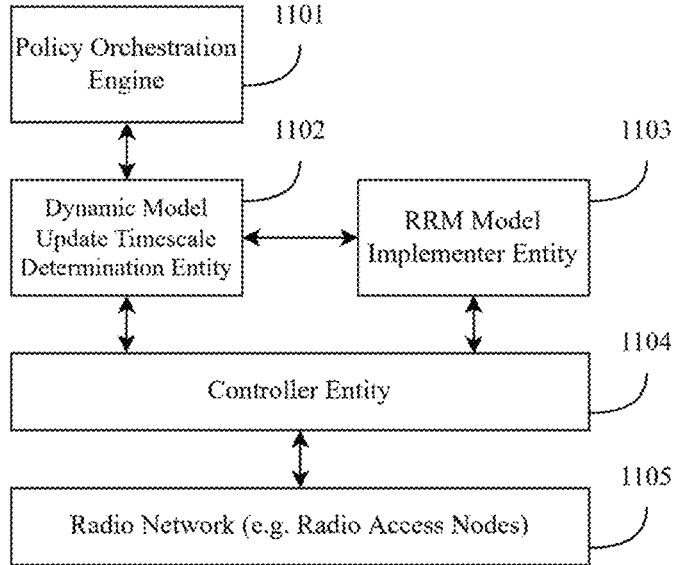
FIG. 11 shows an exemplary illustration of various entities of a mobile communication network.

FIG. 11 shows an exemplary illustration of various entities of a mobile communication network. It is to be noted that the exemplary illustration may indicate a logical structure, in which one or more of the entities of the mobile communication network 1100 may be implemented by the same physical entity, or a distributed physical entity (a plurality of devices operating collectively) may implement one of the entities of the mobile communication network 1100. The mobile communication network 1100 may include an orchestrator entity, a policy orchestration engine 1101 configured to oversee orchestration aspects, management aspects, and automation of RAN elements.

The policy orchestration engine 1101 may be configured to communicate with at least a dynamic model update timescale determination entity 1102 that may include a device (e.g. the device 400) including a processor configured to determine an update timescale for an RRM model, in accordance with various aspects provided in this disclosure.

The dynamic model update timescale determination entity 1102 may communicate with at least an RRM model implementer entity 1103 that is configured to implement an RRM model to manage the radio resources of a cell of a radio network 1105.

In this illustrative example, the RRM model implementer entity 1103 may also communicate with a controller entity 1104 that may configure and/or control radio resources of the radio network. The RRM model implementer entity 1103 may receive data used to input to an RRM model from the controller entity 1104 and the RRM model implementer entity 1103 may provide RRM parameters based on inferences on the received data to the controller entity 1104. The controller entity 1104 may configure and/or control the radio network 1105 based on the RRM parameters received from the RRM model implementer entity 1103 to manage radio resources of the radio network 1105. The radio network 1105 may include one or more radio access nodes designated for one or more cells, and the controller entity 1104 may communicate with each one or more radio access node to manage radio resources of a respective one or more cell.

Within this exemplary mobile communication network 1100, an application of an entity may be configured to perform various aspects provided herein for the respective entity. Applications associated with different entities may communicate with each other via application programming interfaces (APIs) to receive and/or send data, information, messages, etc. In this illustrative example, the RRM model implementer entity 1103 may identify a presence of an entity that is configured to determine an update timescale, namely the dynamic model update timescale determination entity 1102, via an API designated to identify an entity that is configured to determine an update timescale.

The RRM model implementer entity 1103 may, optionally in response to the identification of the dynamic model update timescale determination entity 1102, encode cell state information associated with one or more cells for which the RRM model implementer entity 1103 determines RRM parameters to send the encoded cell state information to the dynamic model update timescale determination entity 1102. Accordingly, the dynamic model update timescale determination entity 1102 may obtain cell data representative of conditions of the one or more cells based on received encoded cell state information.

Alternatively, or additionally, the RRM model implementer entity 1103, or the policy orchestration engine 1101, may send a request to the dynamic model update timescale determination entity 1102 representative of a request for an update timescale for designated one or more cells. In response to receiving such a request, the dynamic model update timescale determination entity 1102 may request cell state information for the designated one or more cells from the controller entity 1104. The controller entity 1104 may send encoded cell state information associated with the designated one or more cells to the dynamic model update timescale determination entity 1102. Accordingly, the dynamic model update timescale determination entity 1102 may obtain cell data representative of conditions of the designated one or more cells based on received encoded cell state information.

Furthermore, the dynamic model update timescale determination entity 1102 may receive operator information from the policy orchestration engine 1101, and the operator information may represent one or more preferences of an MNO, in particular configurations and commands provided by the policy orchestration engine 1101 to configure determination of update timescales. The operator information may represent various information as provided in this disclosure, exemplarily an identifier for each cell or a group of cells based on which conditions an update timescale is to be determined, an identifier for each RRM model implementer entity in the mobile communication network 1100 for which an update timescale determination service is to be provided, one or more thresholds, limitations, or requirements for performance metrics (e.g. data throughput, compute overhead, etc.), weights associated for performance metrics for determination of update timescales for the respective one or more cells (i.e. $w_1$ and $w_2$). The dynamic model update timescale determination entity 1102 may receive the operator information via an API designated to receive policies from the policy orchestration engine 1101.

Furthermore, the dynamic model update timescale determination entity 1102 may receive model information from the RRM model implementer entity 1103, and the model information may represent various attributes for the RRM model, in particular, used to configure the determination of update timescales. The model information may represent various information as provided in this disclosure, exemplarily a plurality of update timescales (e.g. suggested update timescales, such as 1 day, 1 week, 1 month, etc.) among which the dynamic model update timescale determination entity 1102 may select an update timescale for the respective RRM model, capability and requirements with respect to the respective RRM model such as minimum performance requirements of the respective RRM model, maximum compute overhead for inference and/or training the respective RRM model, sample timescale for the RRM model, order of samples for training the respective RRM model, weighting factor for the respective performance metrics for determination of an update timescale, an objective function used by the RRM model, an objective function based on predefined performance metric parameters that may be a data throughput parameter and an overhead parameter, other key performance indicators with respect to the conditions of the cell or the respective RRM model.

As mentioned above, the RRM model implementer entity 1103 may provide cell state information that may also include, exemplarily, information representative of downlink uplink physical resource block usage, channel information such as reference signal strength indicators and/or reference signal receive power for communication channels between network access node of the respective cell and terminal devices, throughput information, latency information, mobility, etc. used to obtain the cell data.

Accordingly, in accordance with various aspects provided in this disclosure, the dynamic model update timescale determination entity 1102 may determine an update timescale dynamically, based on conditions of the one or more cells, for the respective RRM model of the RRM model implementer entity 1103 used to manage radio resources of the one or more cells of the radio network 1105, in which some examples, that may be the update timescale based on predicted performance metrics. The dynamic model update timescale determination entity 1102 may send the determined update timescale to the RRM model implementer entity 1103, and the RRM model implementer entity 1103 may update model parameters of the respective RRM model used to manage radio resources of the one or more cells based on the determined update timescale. The RRM model implementer entity 1103 may include a training agent that is configured to re-train the respective RRM model by first initializing model parameters of the respective RRM model, and/or that is configured to further train the respective RRM model by not initializing model parameters of the respective RRM model (e.g. optimize the trained RRM model). The training agent may accordingly, at an instance of time that the determined update timescale represents, update the respective RRM model by re-training or by further training the respective RRM model.

Figures 12, 13:
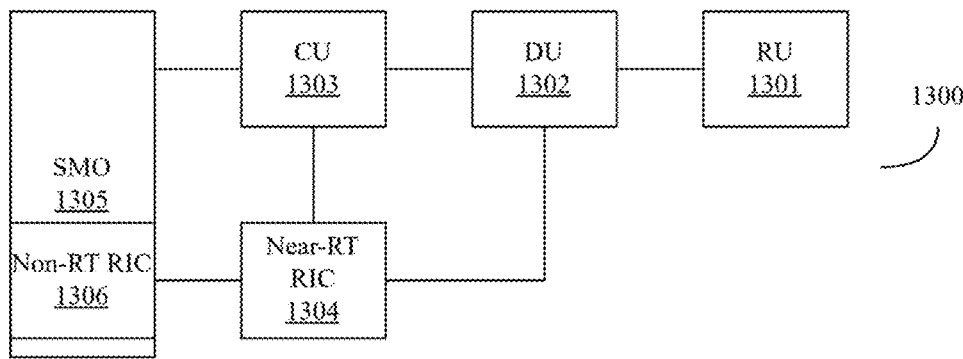
FIG. 12 shows a table for illustrating an exemplary selection of an update timescale based on predicted performance metrics.
FIG. 13 shows an exemplary radio access network architecture in which the radio access network is disaggregated in multiple units.

FIG. 12 shows a table for illustrating an exemplary selection of an update timescale based on predicted performance metrics. In an illustratively demonstrated configuration, in which a device according to various aspects provided herein (e.g. the device 400) may determine an update timescale for an RRM model of a mobile communication network including cells 1201 1 to 11 based on predicted performance metrics using a mathematical function that may map predicted performance metrics to a performance score, and wherein the RRM model may be an RRM model that may determine RRM parameters that may cause a network access node to be switched off in case future load prediction of the respective cell is below a threshold while handing over terminals served by the respective network access nodes to other network access nodes serving for co-located cell(s), in order to save power.

In this illustrative example, predicted performance metrics may include a predicted load of respective cells. The operator information may include information configured to map a predicted load to a performance score and to cause the device to select the highest performance score calculated for a plurality of predicted loads for designated update timescales (e.g. 1 week and 2 weeks) for the respective cell. The table shows the performance scores 1202 based on predicted load for an update timescale of 1 week (e.g. update every 1 week or update next week) for cell 1, for a cluster of cells 2-10, and for cell 11. The table also shows the performance scores 1203 based on predicted load for an update timescale of 2 weeks (e.g. update every 2 weeks, update in 2 weeks) for cell 1, for a cluster of cells 2-10, and for cell 11.

Based on the objective indicated in the operator information, namely to select the highest performance score, the device may determine an update timescale of 1 week for cell 1, encode timescale information representative of the determined update timescale of 1 week, to cause the RRM model to update model parameters used to determine respective RRM parameter for cell 1 to be updated accordingly. Similarly, the device may determine an update timescale of 2 weeks for the cluster of cells 2-10, encode timescale information representative of the determined update timescale of 2 weeks, to cause the RRM model to update model parameters used to determine respective RRM parameter for cells 2-10 to be updated accordingly. Similarly, the device may determine an update timescale of 1 week or of 2 weeks for the cell 11, as they have the same performance score. The device may opt for reducing communication overhead caused by the update and select an update timescale of 2 weeks, or the device may consider other predicted performance metrics (e.g. computation overhead, etc.). The device may encode timescale information representative of the determined update timescale to cause the RRM model to update model parameters used to determine the respective RRM parameter for the cell 11 be updated accordingly.

FIG. 13 shows an exemplary radio access network architecture in which the radio access network is disaggregated into multiple units. In LTE or 5G NR, network access nodes, such as a BS may implement the whole network stack including physical layer (PHY), media access control (MAC), radio link control (RLC), packet data convergence control (PDCP), and radio resource control (RRC) functions of the network stack. In a distributed approach of radio access networks, the processing of the network stack is disaggregated into at least two units (e.g. into RU, DU, and CU). Although the example illustrates a distributed structure that is based on open-RAN (O-RAN) architecture, the skilled person is able to populate the teaching provided herein in other types of distributed architectures, such as baseband unit (BBU) that may operate in the cloud and may be split to a Control Unit (CU) according to Rel.15 of 3GPP standards.

In various deployments in recently emerged RAN architectures, such as Open Radio Access Network (O-RAN) architectures, network access nodes may have functionalities that are split among multiple units with an intention to meet the demands of increased capacity requirements by providing a flexible and interoperable approach for RANs. The exemplary RAN 1300 provided herein includes a radio unit (RU) 1301, a distributed unit (DU) 1302, a central unit (CU) 1303, a near-RT RAN intelligent controller (near RT-RIC) 1304, and a service management and orchestration framework (SMO) 1305 including a non-RT RIC 1306. The skilled person would recognize that the illustrated structure may represent a logical architecture, in which one or more of the entities of the mobile communication network may be implemented by the same physical entity, or a distributed physical entity (a plurality of devices operating collectively) may implement one of the entities of the mobile communication network provided herein.

There are many approaches to provide the split among the multiple units. In this illustrative example, the CU 1303 (e.g. O-CU) may be mainly responsible for non-real time operations hosting the radio resource control (RRC), the PDCP protocol, and the service data adaptation protocol (SDAP). The DU (e.g. O-DU) 1302 may be mainly responsible for real-time operations hosting, for example, RLC layer functions, MAC layer functions, and Higher-PHY functions. RUs 1301 (e.g. O-RU) may be mainly responsible for hosting the Lower-PHY functions to transmit and receive radio communication signals to/from terminal devices (e.g. UEs) and provide data streams to the DU over a fronthaul interface (e.g. open fronthaul). The SMO 1305 may provide functions to manage domains such as RAN management, Core management, Transport management, and the non-RT RIC 1306 may provide functions to support intelligent RAN optimization via policy-based guidance, AI/ML model management, etc. The near-RT RIC 1304 may provide functions for real time optimizations, including hosting one or more xApps that may collect real-time information (per UE or per Cell) and provide services, that may include AI/ML services as well.

The exemplary RAN 1300 is illustrated for the purpose of brevity. The skilled person would recognize the aspects provided herein and may also realize that the exemplary RAN 1300 may include further characterizations, such as the CU may also be—at least logically-distributed into two entities (e.g. CU-Control Plane, CU-User Plane), there may be various types of interfaces between different entities of the exemplary RAN 1300 (e.g. E2, F1, O1, X2, NG-u, etc.).

In accordance with the exemplary distributed RAN architecture, a UE may transmit radio communication signals to the RU 1301 and receive radio communication signals from the RU 1301. The processing associated with the communication is performed at the respective layers of the network stack by respective entities that are responsible to perform the corresponding function of the respective layers.

In accordance with various aspects of this disclosure and this exemplary RAN 1300, aspects associated with the management of radio resources may include MAC layer functions within the DU 1302. Accordingly, the DU 1302 may include aspects of a controller entity configured to manage radio resources in response to received RRM parameters provided herein and configured to manage radio resources for a communication via the communication channel that is established between the RU 1301 and a UE.

In accordance with various aspects of this disclosure and this exemplary RAN 1300, aspects associated with RRM models for the determination of RRM parameters to be used to configure radio resources of a cell may be performed by functions of the near-RT RIC 1304. Accordingly, the near-RT RIC may include aspects associated with an RRM model configured to determine RRM parameters for a cell, which the RRM parameters are used to manage the radio resources of the cell provided herein. In such an example, near-RT RIC 1304 may obtain information to determine RRM parameters using an RRM model via the DU 1302, the CU 1303, or even via the RU 1301.

In accordance with various aspects of this disclosure and this exemplary RAN 1300, aspects associated with the determination of an update timescale for an RRM model (e.g. the device 400) (e.g. the RRM model implemented by near-RT RIC 1304) may be performed by functions of the near RT-RIC 1304 or the non-RT RIC 1306. In a case that the aspects associated with determination of an update timescale is implemented by the non-RT RIC 1306, the non-RT RIC 1306 may receive operator information from the SMO 1305, the non-RT RIC 1306 may exchange model information and determined update timescales with the near-RT RIC 1304. The non-RT RIC 1306 may receive cell state information from the near-RT RIC 1304, or from the DU 1302, the CU 1303, and/or even from the RU 1301.

The near-RT RIC 1304 may receive the cell state information from the DU 1302 or the CU 1303. The near RT-RIC 1304 may determine an update timescale for an RRM model that the RT-RIC 1304 may implement to output RRM parameters in accordance with various aspects provided herein. Accordingly, the respective RRM model and a controller (e.g. the processor 600, the controller 603) for determination of update timescales may communicate with each other to exchange information in accordance with various aspects provided herein.

In accordance with various aspects provided herein, the AI/ML used to determine an update timescale for an RRM model may be implemented in an entity other than RICs provided herein. In various examples, any one of the entities provided within the exemplary RAN, in particular, the DU 1302 or the CU 1303 may include aspects of a device (e.g. the device 400) provided herein, that is configured to obtain cell data that represent conditions of a cell as they may have an established connection with the RU 1301 and provide the input data that is based on the obtained cell data an AI/ML that is external to the DU 1302 or the CU 1303. In various examples, the near-RT RIC 1304 or the non-RT RIC 1306 may implement the AI/ML that is configured to determine an update timescale according to various aspects provided herein. The entity that implements the AI/ML may provide information representing the determined update timescale to the DU 1302 and the CU 1303, and based on the provided information, and the DU 1302 or the CU 1303 respectively may provide timescale information to an entity that implements the RRM model. In various examples, the DU 1302 or the CU 1303 may implement the RRM model.

FIG. 14 shows an example of a method. The method may include: obtaining 1401 cell data representative of one or more attributes associated with a state of a cell of a mobile communication network, wherein radio resources of the cell are managed based on a radio resource management model;

determining 1402, for the radio resource management model, an update timescale for the cell based on the cell data; communicating 1403 timescale information representative of the determined update timescale to the radio resource management model, wherein the timescale information is configured to cause the radio resource management model to update model parameters to manage the radio resources of the cell based on the determined update timescale The following examples pertain to further aspects of this disclosure.

In example 1, the subject matter includes a device that may include: a memory; a processor configured to: obtain cell data representative of one or more attributes associated with a state of a cell of a mobile communication network, can optionally include that radio resources of the cell are managed based on a radio resource management model; determine, for the radio resource management model, an update timescale for the cell based on the cell data; communicate timescale information representative of the determined update timescale to the radio resource management model, can optionally include that the timescale information is configured to cause the radio resource management model to update model parameters to manage the radio resources of the cell based on the determined update timescale.

In example 2, the subject matter of example 1, can optionally include that the processor is further configured to determine the update timescale based on operator information representative of preferences of a mobile network operator (MNO). In example 3, the subject matter of example 1 or example 2, can optionally include that the processor is further configured to determine the update timescale based on model information representative of capabilities and/or requirements associated with the radio resource management model. In example 4, The device any one of example 1 to 3, can optionally include that the processor is further configured to determine the update timescale by selecting from a plurality of update timescales; can optionally include that the radio resource management model may provide the plurality of update timescales.

In example 5, the subject matter of example 4, can optionally include that the processor is further configured to determine the update timescale by using a trained machine learning model configured to receive input based on the cell data and at least one of the plurality of update timescales and provide a predicted metric associated with performance of the radio resource management model for the at least one of the plurality of update timescales. In example 6, the subject matter of example 5, can optionally include that each predicted metric for one of the plurality of update timescales includes a performance metric value representative of data throughput within the cell, and an overhead metric value representative of power and/or computing overhead to operate the cell. In example 7, the subject matter of example 6, can optionally include that the processor is further configured to obtain a plurality of predicted metrics for the plurality of update timescales; can optionally include that the processor is further configured to determine the update timescale by selecting one of the plurality of update timescales based on obtained plurality of predicted metrics and preference parameters within the operator information.

In example 8, the subject matter of example 7, can optionally include that the preference parameters are configured to represent a mapping between one or more predefined performance metric values and one or more predefined overhead metric values. In example 9, the subject matter of example 7 or example 8, can optionally include that the preference parameters are representative of a predetermined mapping operation used to map an input performance metric value and an input overhead metric value to an output value; can optionally include that the processor is further configured to determine the update timescale by selecting the one of the plurality of candidate update time scales that maximizes the output value. In example 10, the subject matter of example 7, can optionally include that the preference parameters includes at least one of a performance threshold and/or an overhead threshold.

In example 11, the subject matter of example 4, can optionally include that the processor is further configured to determine the update timescale by using a reinforcement learning model configured to receive the cell data as input representative of a state at a first instance of time, and determine, based on model parameters, an action may include selecting one of the plurality of update timescales. In example 12, the subject matter of example 11, can optionally include that the processor is further configured to update the model parameters based on an observation at a second instance of time that is after the first instance of time, can optionally include that the observation is associated with the selection of the one of the plurality of update timescales representative of an effect of the selected update timescale within the mobile communication network. In example 13, the subject matter of example 12, can optionally include that the processor is further configured to obtain the observation may include performance information representative of data throughput obtained within the cell and overhead information representative of power and/or computing overhead used within the cell.

In example 14, the subject matter of example 13, can optionally include that the processor is further configured to calculate a reward based on the performance information and the overhead information; can optionally include that the processor is further configured to adjust the model parameters based on the calculated reward. In example 15, the subject matter of any one of examples 4 to 14, can optionally include that the processor is configured to decode information representative of the plurality of candidate update timescales received from the radio resource management model. In example 16, the subject matter of any one of examples 3 to 15, can optionally include that the radio resource management model is implemented by a further device that is external to the device; can optionally include that the processor is configured to encode the timescale information for a transmission to the further device. In example 17, the subject matter of example 16, can optionally include that the mobile communication network includes an open radio access network (O-RAN); can optionally include that the further device includes a radio access network intelligent controller (RIC); can optionally include that the RIC includes a near real-time RIC. In example 18, the subject matter of example 17, can optionally include that the processor is configured to decode the model information received from the further device; can optionally include that the model information further includes information representative of at least one of set of suggested update timescales, performance and computation requirements for radio resource management model.

In example 19, the subject matter of example 17 or example 18, can optionally include that the processor is configured to decode cell state information received from the further device to obtain the cell data. In example 20, the subject matter of any one of examples 17 to 19; can optionally include that the processor is configured to decode cell state information received from a controller entity of the O-RAN; can optionally include that the controller entity includes a control unit (CU) or a distributed unit (DU). In example 21, the subject matter of any one of examples 2 to 20; can optionally include that the operator information is provided by an entity of the mobile communication network that is configured to orchestrate policies associated with management of the mobile communication network; can optionally include that the processor is configured to decode the operator information received from the entity. In example 22, the subject matter of any one of examples 1 to 21; can optionally include that the obtained cell data is representative of the one or more attributes associated with states of a set of cells including the cell, each cell of the plurality of cells is managed by the radio resource management model; can optionally include that the determined update timescale is for the set of cells; can optionally include that the timescale information is configured to cause the radio resource management model to update model parameters to manage the radio resources of the set of cells.

In example 23, the subject matter of example 22; can optionally include that the processor is further configured to select the set of cells from a plurality of cells based on similarities of at least one attribute of the one or more attributes between the plurality of cells; can optionally include that the processor is further configured to apply a predetermined threshold associated with the similarities to select the set of cells. In example 24, the subject matter of any one of examples 1 to 23, can optionally include that the one or more attributes include at least one of user density of the cell, location of the cell, topology associated with the location of the cell, load of the cell, mobility of mobile communication devices served by the cell, computing resources associated with managing radio resources for the cell, and cross-interference between the cell and other interfering cells. In example 25, the subject matter of any one of examples 1 to 24, can optionally include that the cell data further includes information representative of, each for a period of time, at least one of a number or size of used radio communication resources to communicate within the cell, a number of communication devices served by the cell, computing services associated with the cell and a number of communication devices that used each computing service, a number of communication devices having network traffic over a predefined threshold, communication channel information representative of attributes of the communication channel for each communication device served by the cell, time information representative of the period of time for each of the one or more attributes.

In example 26, the subject matter of example 25, can optionally include that the communication channel information includes at least one of channel quality information associated with the communication devices, and reference signal strength indicators or reference signal received power measurements of respective established communication channels with the communication devices. In example 27, the subject matter of any one of examples 1 to 26, can optionally include that the cell data further includes a plurality of data items for each attribute of the one or more attributes may include at least one of the user density of the cell, the load of the cell, the computing resources associated with managing radio resources for the cell, and cross-interference between the cell and other interfering cells; can optionally include that each data item for the respective attribute includes data associated with the respective attribute for a past instance of time. In example 28, the subject matter of any one of examples 1 to 27, can optionally include that the memory is configured to store the cell data. In example 29, the subject matter of any one of examples 1 to 28, may further include: a transceiver configured to transmit and/or receive communication signals.

In example 30, the subject matter includes a method that may include: obtaining cell data representative of one or more attributes associated with a state of a cell of a mobile communication network, can optionally include that radio resources of the cell are managed based on a radio resource management model; determining, for the radio resource management model, an update timescale for the cell based on the cell data; communicating timescale information representative of the determined update timescale to the radio resource management model, can optionally include that the timescale information is configured to cause the radio resource management model to update model parameters to manage the radio resources of the cell based on the determined update timescale.

In example 31, the subject matter of example 30, may further include: determining the update timescale based on operator information representative of preferences of a mobile network operator (MNO). In example 32, the subject matter of example 30 or example 31, may further include: determining the update timescale based on model information representative of capabilities and/or requirements associated with the radio resource management model. In example 33, the subject matter of any one of examples 30 to 32, may further include: determining the update timescale by selecting from a plurality of update timescales; can optionally include that the radio resource management model provides the plurality of update timescales. In example 34, the subject matter of example 33, may further include: determining the update timescale by using a trained machine learning model configured to receive input based on the cell data and at least one of the plurality of update timescales and provide a predicted metric associated with performance of the radio resource management model for the at least one of the plurality of update timescales.

In example 35, the subject matter of example 34, can optionally include that each predicted metric for one of the plurality of update timescales includes a performance metric value representative of data throughput within the cell, and an overhead metric value representative of power and/or computing overhead to operate the cell. In example 36, the subject matter of example 35, may further include: obtaining a plurality of predicted metrics for the plurality of update timescales; determining the update timescale by selecting one of the plurality of update timescales based on obtained plurality of predicted metrics and preference parameters within the operator information. In example 37, the subject matter of example 36, can optionally include that the preference parameters are representative of a mapping between one or more predefined performance metric values and one or more predefined overhead metric values. In example 38, the subject matter of example 36 or example 37, can optionally include that the preference parameters are representative of a predetermined mapping operation used to map an input performance metric value and an input overhead metric value to an output value; can optionally include that the method further includes determining the update timescale by selecting the one of the plurality of candidate update time scales that maximizes the output value.

In example 39, the subject matter of example 36, can optionally include that the preference parameters includes at least one of a performance threshold and/or an overhead threshold. In example 40, the subject matter of example 33, may further include: determining the update timescale by using a reinforcement learning model configured to receive the cell data as input representative of a state at a first instance of time, and determine, based on model parameters, an action may include selecting one of the plurality of update timescales. In example 41, the subject matter of example 40, may further include: updating the model parameters based on an observation at a second instance of time that is after the first instance of time, can optionally include that the observation is associated with the selection of the one of the plurality of update timescales representative of an effect of the selected update timescale within the mobile communication network. In example 42, the subject matter of example 41, may further include: obtaining the observation may include performance information representative of data throughput obtained within the cell and overhead information representative of power and/or computing overhead used within the cell.

In example 43, the subject matter of example 42, may further include: calculating a reward based on the performance information and the overhead information; adjusting the model parameters based on the calculated reward. In example 44, the subject matter of any one of examples 33 to 43, may further include: decoding information representative of the plurality of candidate update timescales received from the radio resource management model. In example 45, the subject matter of any one of examples 32 to 44, can optionally include that the radio resource management model is implemented by a further device that is external to the device; can optionally include that the method includes encoding the timescale information for a transmission to the further device. In example 46, the subject matter of example 45, can optionally include that the mobile communication network includes an open radio access network (O-RAN); can optionally include that the further device includes a radio access network intelligent controller (RIC); can optionally include that the RIC includes a near real-time RIC.

In example 47, the subject matter of example 46, may further include: decoding the model information received from the further device; can optionally include that the model information further includes information representative of at least one of set of suggested update timescales, performance and computation requirements for radio resource management model. In example 48, the subject matter of example 46 or example 47, may further include: decoding cell state information received from the further device to obtain the cell data. In example 49, the subject matter of any one of examples 46 or example 47; may further include: decoding cell state information received from a controller entity of the O-RAN; can optionally include that the controller entity includes a control unit (CU) or a distributed unit (DU). In example 50, the subject matter of any one of examples 31 to 49; receiving the operator information is from an entity of the mobile communication network that is configured to orchestrate policies associated with management of the mobile communication network; can optionally include that the method further includes decoding the operator information received from the entity. In example 51, the subject matter of any one of examples 30 to 50; can optionally include that the obtained cell data is representative of the one or more attributes associated with states of a set of cells including the cell, each cell of the plurality of cells is managed by the radio resource management model; can optionally include that the determined update timescale is for the set of cells; can optionally include that the timescale information is configured to cause the radio resource management model to update model parameters to manage the radio resources of the set of cells.

In example 52, the subject matter of example 51; may further include: selecting the set of cells from a plurality of cells based on similarities of at least one attribute of the one or more attributes between the plurality of cells; applying a predetermined threshold associated with the similarities to select the set of cells. In example 53, the subject matter of any one of examples 30 to 52, can optionally include that the one or more attributes include at least one of user density of the cell, location of the cell, topology associated with the location of the cell, load of the cell, mobility of mobile communication devices served by the cell, computing resources associated with managing radio resources for the cell, and cross-interference between the cell and other interfering cells. In example 54, the subject matter of any one of examples 30 to 53, can optionally include that the cell data further includes information representative of, each for a period of time, at least one of a number or size of used radio communication resources to communicate within the cell, a number of communication devices served by the cell, computing services associated with the cell and a number of communication devices that used each computing service, a number of communication devices having network traffic over a predefined threshold, communication channel information representative of attributes of the communication channel for each communication device served by the cell, time information representative of the period of time for each of the one or more attributes.

In example 55, the subject matter of example 54, can optionally include that the communication channel information includes at least one of channel quality information associated with the communication devices, and reference signal strength indicators or reference signal received power measurements of respective established communication channels with the communication devices. In example 56, the subject matter of any one of examples 30 to 55, can optionally include that the cell data further includes a plurality of data items for each attribute of the one or more attributes may include at least one of the user density of the cell, the load of the cell, the computing resources associated with managing radio resources for the cell, and cross-interference between the cell and other interfering cells; can optionally include that each data item for the respective attribute includes data associated with the respective attribute for a past instance of time. In example 57, the subject matter of any one of examples 30 to 56, storing the cell data into a memory.

In example 58, a non-transitory computer-readable medium may include one or more instructions which, if executed by a processor, cause the processor to: obtain cell data representative of one or more attributes associated with a state of a cell of a mobile communication network, can optionally include that radio resources of the cell are managed based on a radio resource management model; determine, for the radio resource management model, an update timescale based on the cell data; communicate timescale information representative of the determined update timescale to the radio resource management model, can optionally include that the timescale information is configured to cause the radio resource management model to update model parameters to manage the radio resources of the cell based on the determined update timescale.

In example, 59, the non-transitory computer-readable medium may further include one or more instructions, which if executed by a processor, cause the processor to perform a method according to examples 30 to 57.

In example 60, a device may include: a memory, a processor configured to: obtain cell data representative of conditions of a cell of a mobile communication network; can optionally include that a radio resource management model is used to manage radio resources of the cell; select an update timescale from a plurality of predetermined update timescales based on the cell data; encode timescale information representative of an instance of time in which model parameters of the radio resource management model is to be updated for a transmission to a further communication device configured to implement the radio resource management module. In example 61, the device may further include any one of aspects provided in this disclosure, in particular, aspects provided in examples 1 to 29.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method. All acronyms defined in the above description additionally hold in all claims included herein.

What is claimed is:

1. A device comprising:
a memory;
a processor configured to:
   obtain cell data representative of one or more attributes associated with a state of a cell of a mobile communication network, wherein radio resources of the cell are managed based on a radio resource management model;
   determine, for the radio resource management model, an update timescale for the cell based on the cell data;
   communicate timescale information representative of the determined update timescale to the radio resource management model, wherein the timescale information is configured to cause the radio resource management model to update model parameters to manage the radio resources of the cell based on the determined update timescale.

2. The device of claim 1,
wherein the processor is further configured to determine the update timescale based on operator information representative of preferences of a mobile network operator (MNO).

3. The device of claim 1,
wherein the processor is further configured to determine the update timescale based on model information representative of capabilities and/or requirements associated with the radio resource management model.

4. The device of claim 1,
wherein the processor is further configured to determine the update timescale by selecting from a plurality of update timescales;
wherein the plurality of update timescales is provided by the radio resource management model.

5. The device of claim 4,
wherein the processor is further configured to determine the update timescale by using a trained machine learning model configured to receive input based on the cell data and at least one of the plurality of update timescales and provide a predicted metric associated with performance of the radio resource management model for the at least one of the plurality of update timescales.

6. The device of claim 5,
wherein each predicted metric for one of the plurality of update timescales comprises a performance metric value representative of data throughput within the cell, and an overhead metric value representative of power and/or computing overhead to operate the cell.

7. The device of claim 6,
wherein the processor is further configured to obtain a plurality of predicted metrics for the plurality of update timescales;
wherein the processor is further configured to determine the update timescale by selecting one of the plurality of update timescales based on obtained plurality of predicted metrics and preference parameters within the operator information.

8. The device of claim 7,
wherein the preference parameters are representative of a predetermined mapping operation used to map an input performance metric value and an input overhead metric value to an output value;
wherein the processor is further configured to determine the update timescale by selecting the one of the plurality of update timescales that maximizes the output value.

9. The device of claim 4,
wherein the processor is further configured to determine the update timescale by using a reinforcement learning model configured to receive the cell data as input representative of a state at a first instance of time, and determine, based on model parameters, an action comprising selecting one of the plurality of update timescales.

10. The device of claim 9,
wherein the processor is further configured to update the model parameters based on an observation at a second instance of time that is after the first instance of time, wherein the observation is associated with the selection of the one of the plurality of update timescales representative of an effect of the selected update timescale within the mobile communication network.

11. The device of claim 10,
wherein the processor is further configured to obtain the observation comprising performance information representative of data throughput obtained within the cell and overhead information representative of power and/or computing overhead used within the cell.

12. The device of claim 11,
wherein the processor is further configured to calculate a reward based on the performance information and the overhead information;
wherein the processor is further configured to adjust the model parameters based on the calculated reward.

13. The device of claim 1,
wherein the radio resource management model is implemented by a further device that is external to the device;
wherein the processor is configured to encode the timescale information for a transmission to the further device.

14. The device of claim 13,
wherein the mobile communication network comprises an open radio access network (O-RAN);
wherein the further device comprises a radio access network intelligent controller (RIC);
wherein the RIC comprises a near real-time RIC;
wherein the device comprises one of a non real-time RIC, a control unit, or a distributed unit.

15. The device of claim 14,
wherein the processor is configured to decode the model information received from the further device;
wherein the model information further comprises information representative of at least one of set of suggested update timescales, performance and computation requirements for radio resource management model.

16. The device of claim 15,
wherein the processor is configured to decode cell state information received from the further device to obtain the cell data.

17. The device of claim 15,
wherein the processor is configured to decode cell state information received from a controller entity of the O-RAN;
wherein the controller entity comprises a control unit (CU) or a distributed unit (DU).

18. The device of claim 1, wherein the processor is further configured to select a set of cells from a plurality of cells based on similarities of at least one attribute of the one or more attributes between the plurality of cells; wherein the processor is further configured to apply a predetermined threshold associated with the similarities to select the set of cells.

19. The device of claim 18, wherein the obtained cell data is representative of the one or more attributes associated with states of the set of cells including the cell, each cell of the plurality of cells is managed by the radio resource management model; wherein the determined update timescale is for the set of cells; wherein the timescale information is configured to cause the radio resource management model to update model parameters to manage the radio resources of the set of cells.

20. The device of claim 1,
wherein the one or more attributes comprise at least one of user density of the cell, location of the cell, topology associated with the location of the cell, load of the cell, mobility of mobile communication devices served by the cell, computing resources associated with managing radio resources for the cell, and cross-interference between the cell and other interfering cells.

21. The device of claim 1,
wherein the cell data further comprises information representative of, each for a period of time, at least one of a number or size of used radio communication resources to communicate within the cell, a number of communication devices served by the cell, computing services associated with the cell and a number of communication devices that used each computing service, a number of communication devices having network traffic over a predefined threshold, communication channel information representative of attributes of the communication channel for each communication device served by the cell, time information representative of the period of time for each of the one or more attributes.

22. A method comprising:
obtaining cell data representative of one or more attributes associated with a state of a cell of a mobile communication network, wherein radio resources of the cell are managed based on a radio resource management model;
determining, for the radio resource management model, an update timescale for the cell based on the cell data;
communicating timescale information representative of the determined update timescale to the radio resource management model, wherein the timescale information is configured to cause the radio resource management model to update model parameters to manage the radio resources of the cell based on the determined update timescale.

23. The method of claim 22, further comprising:
determining the update timescale based on operator information representative of preferences of a mobile network operator (MNO).

24. A non-transitory computer-readable medium comprising one or more instructions which, if executed by a processor, cause the processor to:
obtain cell data representative of one or more attributes associated with a state of a cell of a mobile communication network, wherein radio resources of the cell are managed based on a radio resource management model;
determine, for the radio resource management model, an update timescale based on the cell data;
communicate timescale information representative of the determined update timescale to the radio resource management model, wherein the timescale information is configured to cause the radio resource management model to update model parameters to manage the radio resources of the cell based on the determined update timescale.

25. The non-transitory computer-readable medium of claim 24,
wherein the one or more attributes comprise at least one of user density of the cell, location of the cell, topology associated with the location of the cell, load of the cell, mobility of mobile communication devices served by the cell, computing resources associated with managing radio resources for the cell, and cross-interference between the cell and other interfering cells.

* * * * *